(12) United States Patent
Park et al.

(10) Patent No.: US 12,287,509 B2
(45) Date of Patent: Apr. 29, 2025

(54) HOME APPLIANCE

(71) Applicant: LG Electronics Inc., Seoul (KR)

(72) Inventors: Jaesung Park, Seoul (KR); Hyesun Jung, Seoul (KR); Doyoun Han, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/710,961

(22) PCT Filed: Nov. 16, 2022

(86) PCT No.: PCT/KR2022/018059
§ 371 (c)(1),
(2) Date: May 16, 2024

(87) PCT Pub. No.: WO2023/090841
PCT Pub. Date: May 25, 2023

(65) Prior Publication Data
US 2025/0012966 A1   Jan. 9, 2025

(30) Foreign Application Priority Data

Nov. 16, 2021 (KR) .......................... 10-2021-0157924

(51) Int. Cl.
*F21V 8/00*          (2006.01)
*F25D 27/00*        (2006.01)

(52) U.S. Cl.
CPC ........... *G02B 6/0095* (2013.01); *F25D 27/00* (2013.01); *G02B 6/0075* (2013.01)

(58) Field of Classification Search
CPC .. G02B 6/0038; G02B 6/0028; G02B 6/0073; G02B 6/0021; G02B 6/0036; G02B 6/0061; G02B 6/0068; G02F 1/1336
See application file for complete search history.

(56) References Cited

U.S. PATENT DOCUMENTS

2016/0363718 A1    12/2016  Zhou et al.
2018/0038626 A1*    2/2018  Kim ...................... F25D 23/028
2018/0164030 A1*    6/2018  Lee .......................... F25D 27/00

FOREIGN PATENT DOCUMENTS

| CN | 103250018 | 3/2016 |
|---|---|---|
| JP | 2018-115798 | 7/2018 |
| KR | 10-2013-0058513 | 6/2013 |
| KR | 10-2018-0067382 | 6/2018 |
| KR | 10-2020-0015847 | 2/2020 |

* cited by examiner

*Primary Examiner* — Donald L Raleigh
(74) *Attorney, Agent, or Firm* — Fish & Richardson P.C.

(57) ABSTRACT

The preset invention relates to a home appliance comprising: a cabinet having a storage space formed therein; a door for opening or closing an opened front surface of the cabinet; and a panel assembly mounted on a front surface of the door, wherein the panel assembly comprises: a front plate which forms the outer appearance of the door front surface and through which light passes; a light guide plate provided behind the front plate to guide light toward the front plate; and a lighting device including a plurality of light sources for emitting light having a configured color toward the light guide plate and a substrate on which the plurality of light sources are arranged, and the front plate is formed at one end adjacent to the lighting device and includes an inclination portion having an inclination surface formed to extend in a direction parallel to a direction in which the light sources are arranged.

15 Claims, 24 Drawing Sheets

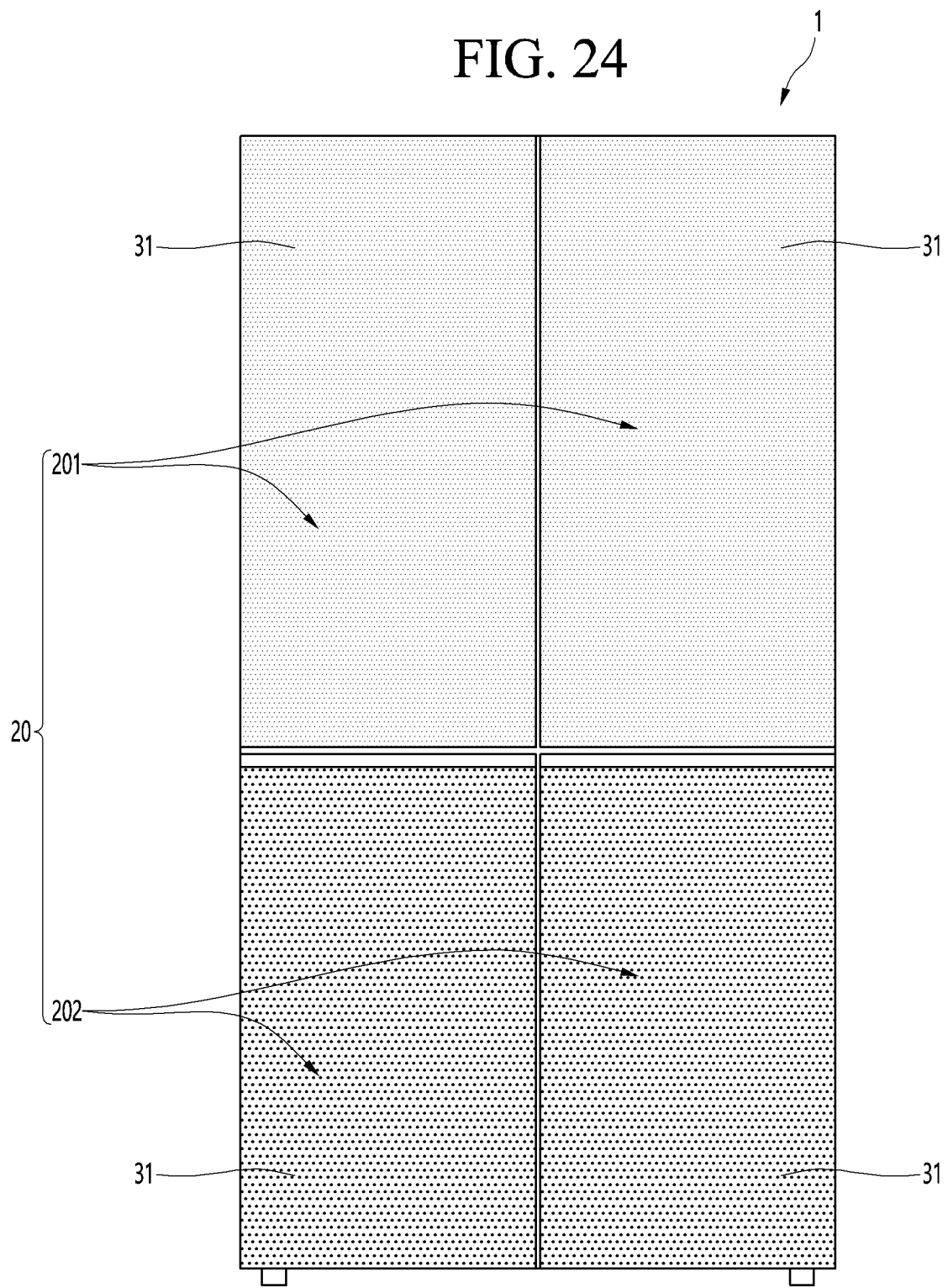

HOME APPLIANCE

CROSS-REFERENCE TO RELATED APPLICATIONS

This application is a National Stage application under 35 U.S.C. § 371 of International Application No. PCT/KR2022/018059, filed on Nov. 16, 2022, which claims the benefit of Korean Application No. 10-2021-0157924, filed on Nov. 16, 2021. The disclosures of the prior applications are incorporated by reference in their entirety.

TECHNICAL FIELD

The present disclosure relates to a refrigerator and a home appliance.

BACKGROUND ART

In general, a refrigerator is a home appliance that allows food to be stored at low temperature in an internal storage space covered by the refrigerator door and is configured to store stored food in an optimal condition by cooling the inside of the storage space using cold air generated through heat exchange with the refrigerant circulating in the refrigeration cycle.

In this way, the refrigerator is gradually becoming larger and more multi-functional in accordance with changes in eating habits and trends in the advancement of products, and a refrigerator equipped with various structures and convenience devices that take user convenience into consideration are being released.

In addition, structures that vary the outer appearance of the front surface of the refrigerator door are being opened to harmonize with the environment in which the refrigerator is placed or with surrounding furniture or home appliances.

In U.S. Pat. No. 8,789,900, a structure in which a decoration panel which forms the outer appearance of the front surface of the door of a refrigerator is mounted is disclosed, and the decoration panel is configured to be detachable so that an outer appearance of the front surface of the door that suits the user's preference may be created.

However, in a refrigerator with this structure, if the user wants to change the outer appearance, the entire decoration panel has to be removed and replaced, and the decoration panel before replacement may no longer be used.

In Chinese Patent No. 103250018, a refrigerator is disclosed in which a reflective layer and a transparent panel are provided on the front surface of the door of the refrigerator, and colored light-emitting members are mounted on both ends of the reflective layer to allow the transparent panel to glow in a set color.

However, in a refrigerator with this structure, there is a problem in that it is impossible to ensure that the light-emitting member is maintained in a stable state due to the nature of the door being repeatedly opened and closed.

In addition, there is a problem in that the transparent panel does not glow with uniform brightness as a whole because the light-emitting members are disposed on both left and right ends. In particular, light cannot be transmitted to the side ends that are bent for the placement of the light-emitting members, which may cause a problem of appearing dark.

DISCLOSURE

Technical Problem

An object of an embodiment of the present disclosure is to provide a home appliance in which a lighting device is mounted on a door panel and the color of light emitted from the lighting device may be selected by the user, allowing various outer appearance changes without replacing the door panel.

An object of an embodiment of the present disclosure is to provide a home appliance in which the entire front surface of the door panel may be uniformly brightened without shadows occurring at the outermost end portion of the door panel.

Technical Solution

A home appliance according to an embodiment of the present disclosure includes a cabinet forming a storage space; a door configured to open and close an open front surface of the cabinet; and a panel assembly mounted on a front surface of the door, in which the panel assembly includes a front plate forming an outer appearance of the front surface of the door and allowing light to pass through; a light guide plate provided behind the front plate and configured to guide light toward the front plate; and a lighting device including a plurality of light sources that emit light of a set color toward the light guide plate and a substrate on which the plurality of light sources are arranged, and the front plate includes an inclined part formed at one end adjacent to the lighting device and having an inclined surface extending in a direction parallel to a direction in which the light source is arranged.

The light source may be arranged in a row from one end to another end of the substrate in an extension direction.

The home appliance may further include a bracket in which the lighting device is accommodated, in which the inclined part may be spaced apart from the bracket and is formed in a direction facing one surface of the bracket.

A front inclined part having an inclined surface may be formed at an end portion facing the inclined part at the front surface of the front plate.

A front curved portion formed as a rounded curved surface may be formed on the end portion facing the inclined part at the front surface of the front plate.

The front plate may have a right-angled part at a position where the inclined part is formed, in place of the inclined part, so that one surface of the bracket and a rear surface of the front plate are perpendicular to each other.

The lighting device may be provided to be spaced downward from a lower surface of the light guide plate, and the inclined part may be formed at a lower end of a rear surface of the front plate.

The home appliance may further include a bracket on which the lighting device is accommodated; and, a plate supporter configured to cover at least a portion of the bracket and to be in contact with one surface of the front plate, in which an upper surface of the plate supporter may be in contact with at least a portion of a lower surface of the front plate.

A lower end of the front plate may be located higher than the light source, and a lower end of the light guide plate may be located lower than the lower end of the front plate.

The inclined part may be inclined upward toward the rear.

The inclined part may be located higher than the light source.

The home appliance may further include a support member disposed between the front plate and the light guide plate to space the light guide plate away from the front plate.

An upper end of the inclined part may be formed so that the angle formed by a first imaginary line L1 connected from the center of the light source to the upper end of the inclined part and a horizontal line L0 extending from the center of the light source in the direction in which the plate supporter is located satisfies an angle smaller than the angle formed by a second imaginary line L2 connected from the center of the light source to a lower end of a rear surface of the support member and the horizontal line L0.

A lower end of the inclined part may be formed so that the angle formed by a third virtual line connected from the center of the light source to a lower end of the inclined part and a horizontal line L0 extending from the center of the light source in the direction in which the plate supporter is located satisfies an angle greater than the angle formed by a fourth imaginary line L4 connected from the center of the light source to a front end of the upper surface of the front surface portion of the bracket and the horizontal line L0.

A vertical distance from a lower end to an upper end of the inclined part may be shorter than the distance at which the lower end portion of the light guide plate is inserted from an upper end of a front surface portion of the bracket.

Advantageous Effect

The following effects may be expected from the refrigerator according to the proposed embodiment.

According to an embodiment of the present disclosure, the color of the light emitted from the lighting device may be adjusted by the user's manipulation, and as a result, the color of the panel forming the front surface of the home appliance or door may be changed to the selected color. Therefore, there is an advantage in that the color of the front surface of the home appliance may be changed to a desired color without replacing the panel.

In particular, there is an advantage in increasing convenience of use by allowing the user to quickly and easily change the color of the outer appearance thereof to a desired color at any time in a state where the panel is mounted.

In addition, the state of the home appliance, operation information, information about the surrounding environment, or the like are displayed by changing the color of the panel, allowing the user to intuitively recognize the information, which has the advantage of further improving convenience of use.

In particular, the corner portion of one surface of the front plate forming the front surface of the door panel facing the lighting device is formed as an inclined surface or at a right angle, so that the outermost end portion of the door panel may glow uniformly and brightly without shading.

In addition, the door of the present disclosure includes a plate supporter that supports at least one surface of the front plate of the corner portion formed as an inclined surface and thus has the advantage of preventing the front plate from being damaged by external impact.

DESCRIPTION OF DRAWINGS

FIG. 21 is a front view illustrating the outer appearance of the front surface of the refrigerator with the lighting device turned on.

FIG. 24 is a front view illustrating the outer appearance of the front surface of the refrigerator with the refrigerating chamber door and the freezing chamber door of the doors each emitting light.

BEST MODE

Hereinafter, specific embodiments of the present disclosure will be described in detail along with the drawings. However, the present disclosure cannot be said to be limited to the embodiments in which the idea of the present disclosure is presented, and other disclosures that are regressive or other embodiments included within the scope of the present disclosure can be easily suggested by adding, changing, or deleting other components.

Before explaining, the direction is defined. In an embodiment of the present disclosure, the direction toward the door based on the cabinet illustrated in FIG. 1 may be referred to as a front direction, the direction toward the cabinet based on the door may be referred to as a rear direction, the direction toward the floor where the refrigerator is installed may be referred to as a lower direction, and the direction away from the floor may be referred to as an upper direction.

Figure 1:
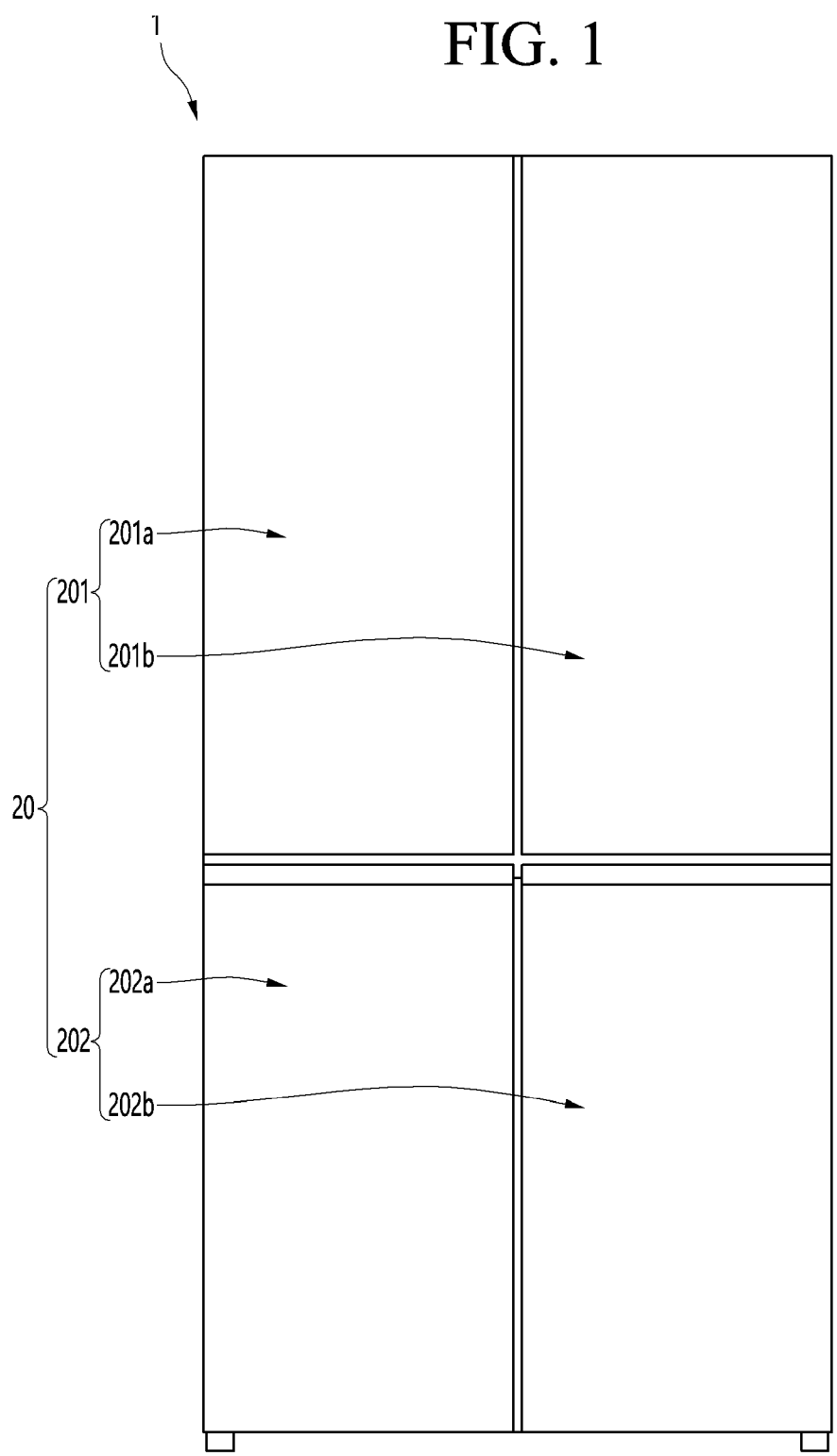
FIG. 1 is a front view illustrating a refrigerator according to an embodiment of the present disclosure.
Figure 2:
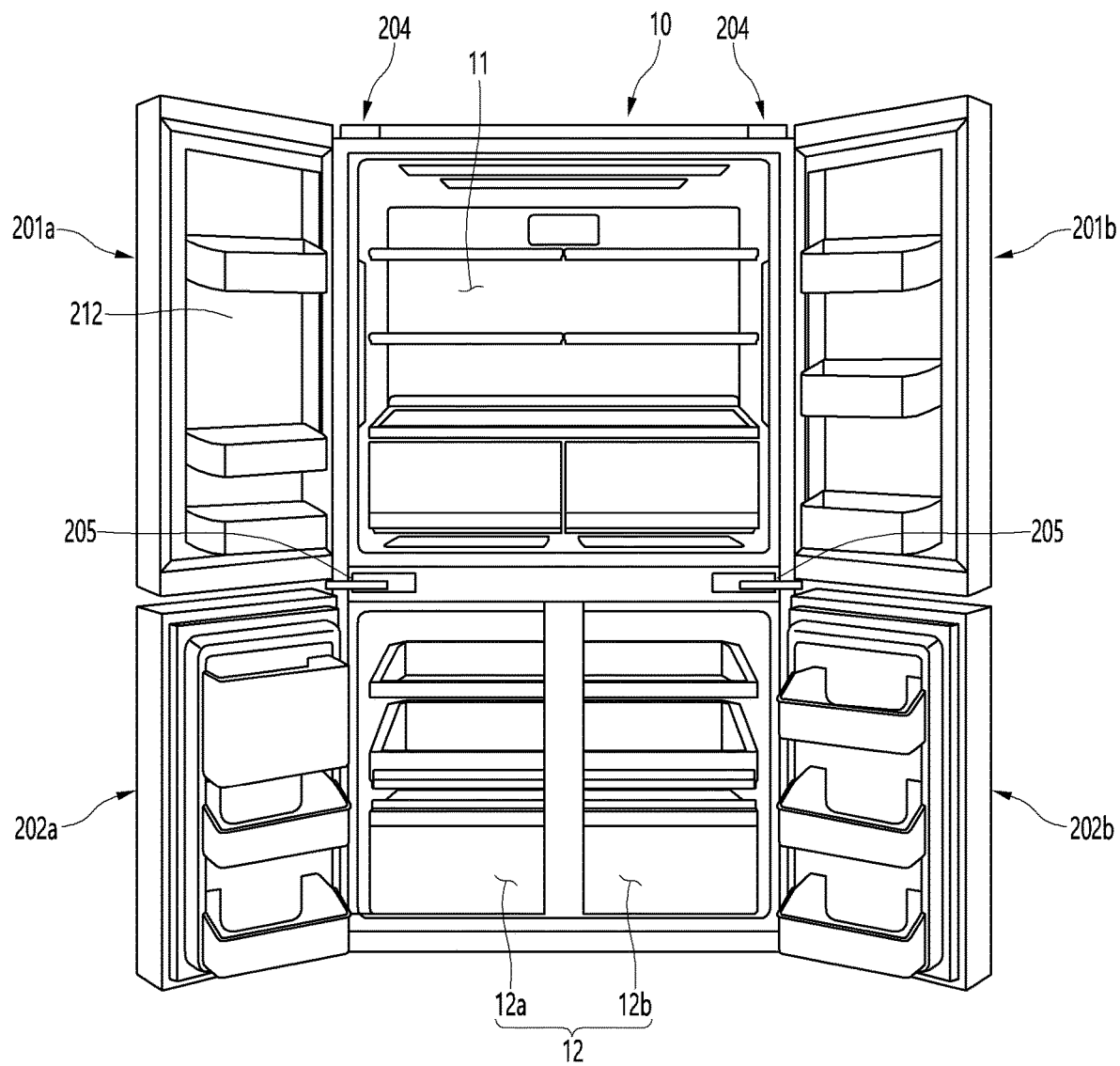
FIG. 2 is a front view illustrating the refrigerator with the door open.

FIG. 1 is a front view illustrating a refrigerator according to an embodiment of the present disclosure, and FIG. 2 is a front view illustrating the refrigerator with the door open.

As illustrated, the outer appearance of the refrigerator 1 according to an embodiment of the present disclosure may be formed by a cabinet 10 forming a storage space and a door 20 opening and closing the storage space of the cabinet 10.

For example, the cabinet 10 may form a storage space divided into upper and lower sections, and a refrigerating chamber 11 may be formed at the upper portion and a freezing chamber 12 may be formed at the lower portion. The refrigerating chamber 11 may be referred to as an upper storage space, and the freezing chamber 12 may be referred to as a lower storage space. Additionally, the freezing chamber 12 may be divided into left and right sides to form a left freezing chamber 12a and a right freezing chamber 12b, respectively. The left freezing chamber 12a may be referred to as a left lower storage space, and the right freezing chamber 12b may be referred to as a right lower storage space.

The door 20 may be configured to open and close the refrigerating chamber 11 and the freezing chamber 12, respectively. For example, the door 20 may be rotatably mounted on the cabinet 10, and the refrigerating chamber 11 and the freezing chamber 12 may be opened and closed by rotation thereof. Of course, the door 20 may have a structure that opens and closes by pulling in and out.

The door 20 may include a refrigerating chamber door 201 that opens and closes the refrigerating chamber 11 and a freezing chamber door 202 that opens and closes the freezing chamber 12. The refrigerating chamber door 201 may be referred to as an upper door and the freezing chamber door 202 may be referred to as a lower door.

Additionally, a pair of the refrigerating chamber doors 201, a left refrigerating chamber door 201a and a right refrigerating chamber door 201b may be disposed side by side. The left refrigerating chamber door 201a and the right refrigerating chamber door 201b may be disposed adjacent to each other and may be formed to have the same size. In addition, the left refrigerating chamber door 201a and the right refrigerating chamber door 201b may be rotated independently to open and close the refrigerating chamber 11.

The upper end and lower end of the refrigerating chamber door 201a and the freezing chamber door 201b may be coupled to the cabinet 10 by hinge devices 204 and 205, respectively. The hinge device 204 may be composed of an upper hinge 204 and a lower hinge 205, and allows the refrigerating chamber door 201a and the freezing chamber door 201b to be rotatably mounted.

Additionally, a pair of the freezing chamber doors 202, a left freezing chamber door 202a and a right freezing chamber door 202b, may be disposed side by side. Additionally, the left freezing chamber door 202a and the right freezing chamber door 202b may be rotated independently to open and close the freezing chamber. The left freezing chamber door 202a and the right freezing chamber door 202b may be disposed adjacent to each other and may be formed to have the same size.

Of course, in this embodiment, for convenience of explanation and understanding, a refrigerator with a structure in which the refrigerating chamber 11 is disposed at the upper portion and the freezing chamber 12 is disposed at the lower portion is described as an example, but, the present disclosure is not limited to the shape of the refrigerator and may be applied to all types of refrigerators equipped with doors.

Meanwhile, the door 20 forms the outer appearance of the front surface of the refrigerator 1 in a closed state, and may form the outer appearance of the refrigerator 1 seen from the front when the refrigerator 1 is installed.

The door 20 may have a structure that allows the front surface to selectively emit light, and may be configured to glow with a set color or brightness. Accordingly, the user may change the color of the front surface or brightness of the door 20 without removing or disassembling the door 20 and change the overall outer appearance of the refrigerator 1.

Hereinafter, the structure of the door 20 will be examined in detail with reference to the drawings. In addition, the embodiment of the present disclosure will be described based on the left refrigerating chamber door 201a, and other doors 201b, 202a, and 202b may also have the same structure.

Hereinafter, the structure of the door 20 will be examined in detail with reference to the drawings.

Figure 3:
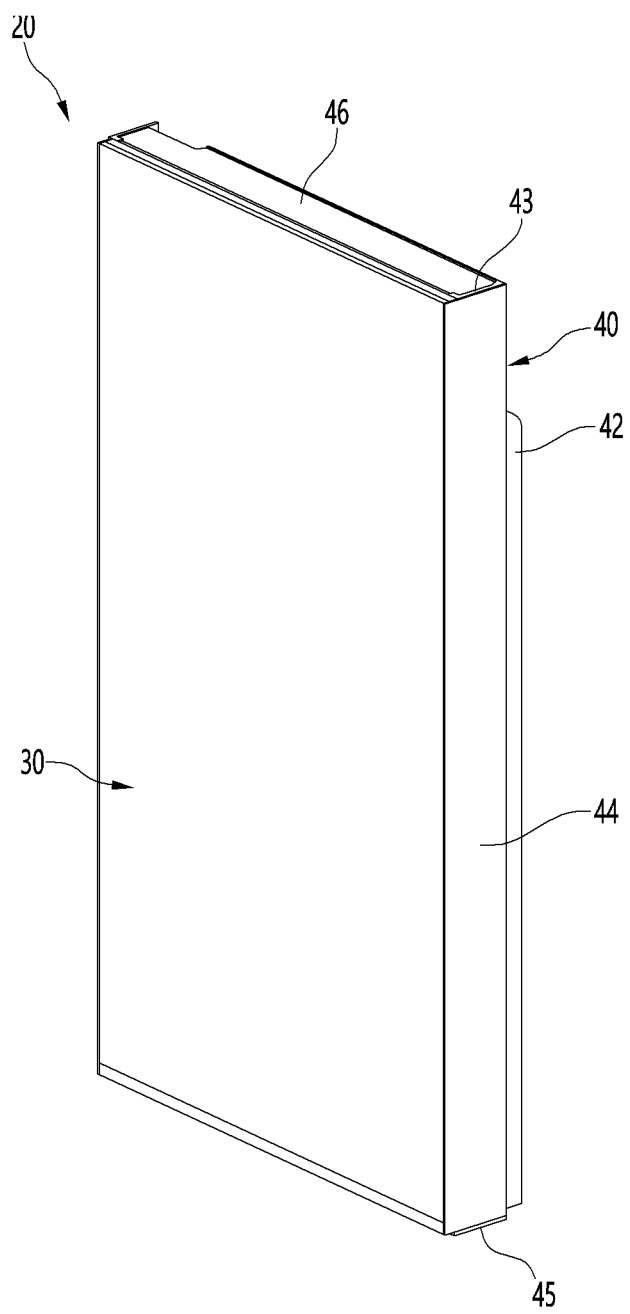
FIG. 3 is a perspective view illustrating the door.
Figure 4:
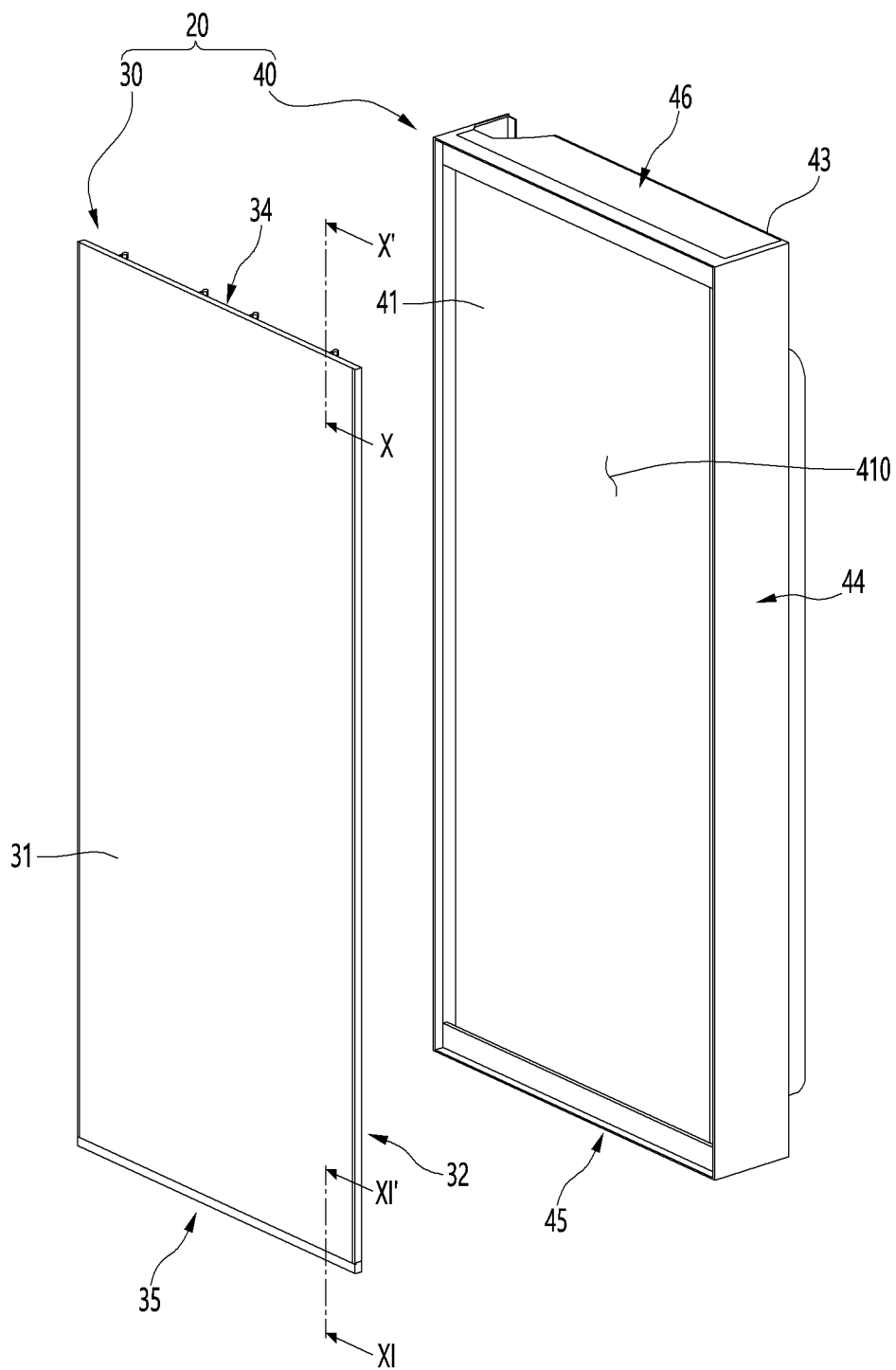
FIG. 4 is an exploded perspective view illustrating a state where the panel assembly and the door body constituting the door are separated from each other.

FIG. 3 is a perspective view illustrating the door, and FIG. 4 is an exploded perspective view illustrating a state where the panel assembly and the door body constituting the door are separated from each other.

As illustrated, the door 20 may include a door body 40 that forms the overall shape of the door 20, and a panel assembly 30 that forms the outer appearance of the front surface of the door 20. In other words, the door 20 may be configured so that the panel assembly 30 is mounted on the front surface of the door body 40.

The door body 40 may include a body plate 41 forming the front surface and a door liner 42 forming the rear surface. The body plate 41 may be made of a metal material and may be formed in a plate shape having a size corresponding to that of the panel assembly 30. Additionally, the door liner 42 may be made of a plastic material and may form the shape of the rear surface of the door 20.

The door body 40 may include side decorations 44 that form both left and right sides of the door body 21. The side decoration 44 may connect both left and right ends of the body plate 41 and both left and right ends of the door liner 42.

In addition, the door body 40 may include an upper cap decoration 43 and a lower cap decoration 45 that form the upper and lower surfaces of the door body 40. The upper cap decoration 43 may be connected to the upper end of the side decoration 44, the upper end of the body plate 41, and the upper end of the door liner 42. Additionally, the lower cap decoration 45 may be connected to the lower end of the side decoration 44, the lower end of the body plate 41, and the lower end of the door liner 42.

The outer appearance of the door body 40 may be formed by the body plate 41, the door liner 42, the side decoration 44, the upper cap decoration 43, and the lower cap decoration 45. In addition, the space inside the door body 40 formed by combining the body plate 41, the door liner 2, the side decoration 44, the upper cap decoration 43, and the lower cap decoration 45, may be filled with an insulating material, and may have an insulating structure to prevent heat transfer through the door 20.

Additionally, the upper cap decoration 43 may be restrained by an upper cover 46 mounted on the open upper surface of the upper cap decoration 43.

Meanwhile, a panel accommodation space 410 opening forward may be formed on the front surface of the door body 40. In other words, the front ends of the side decoration 44, upper cap decoration 43, and lower cap decoration 45 may protrude further forward than the front surface of the body plate 41, and thus the panel accommodation space 410 with an open front surface may be formed in the front of the body plate 41. The panel accommodation space 410 is formed to have a size corresponding to the size of the panel assembly 30, so that the panel assembly 30 may be inserted thereinto. In addition, the perimeter of the panel assembly 30 may be supported by the peripheral surface of the panel accommodation space 410, that is, the protruding portions of the side decoration 44, upper cap decoration 43, and lower cap decoration 45.

The panel assembly 30 is formed in a plate shape and may be formed in a size corresponding to the front surface of the door body 40. Therefore, when the panel assembly 30 is mounted on the front surface of the door body 40, the panel assembly 30 may form the outer appearance of the front surface of the door 20 by covering the front surface of the door body 40. The panel assembly 30 forms the outer appearance of the front surface of the door 20, so it may be referred to as a door panel and since it forms the outer appearance of the front surface of the refrigerator 1, it may also be referred to as an exterior panel.

In a state where the panel assembly 30 is mounted on the door body 40, the rear surface of the panel assembly 30 may be tightly fixed to the body plate 41.

Meanwhile, for fixed installation of the panel assembly 30, the lower end of the panel assembly 30 is caught and restrained with the lower end of the lower cap decoration 45, and the upper end of the panel assembly 30 is coupled to the upper end of the front surface of the upper cap decoration 43, and thus the panel assembly 30 may be firmly coupled to the door body 40. Additionally, the panel assembly 30 may have a structure that may be mounted separately from the door body 40 for service and maintenance.

The front surface of the panel assembly 30 is exposed to the front in a state of being mounted on the door body 40, and may form a substantial outer appearance of the front surface of the door 20. Additionally, the panel assembly 30 may be configured to emit light from the entire front surface and may be configured to emit light in various colors.

For this purpose, a lighting device 36 may be provided inside the panel assembly 30. The lighting device 36 may be connected to an electric wire (not illustrated) for power supply and control. The electric wire is exposed to the outside at the rear surface of the panel assembly 30, and a connector (not illustrated) may be provided at an end portion of the wire.

Hereinafter, the structure of the panel assembly 30 will be examined in detail with reference to the drawings.

Figure 5:
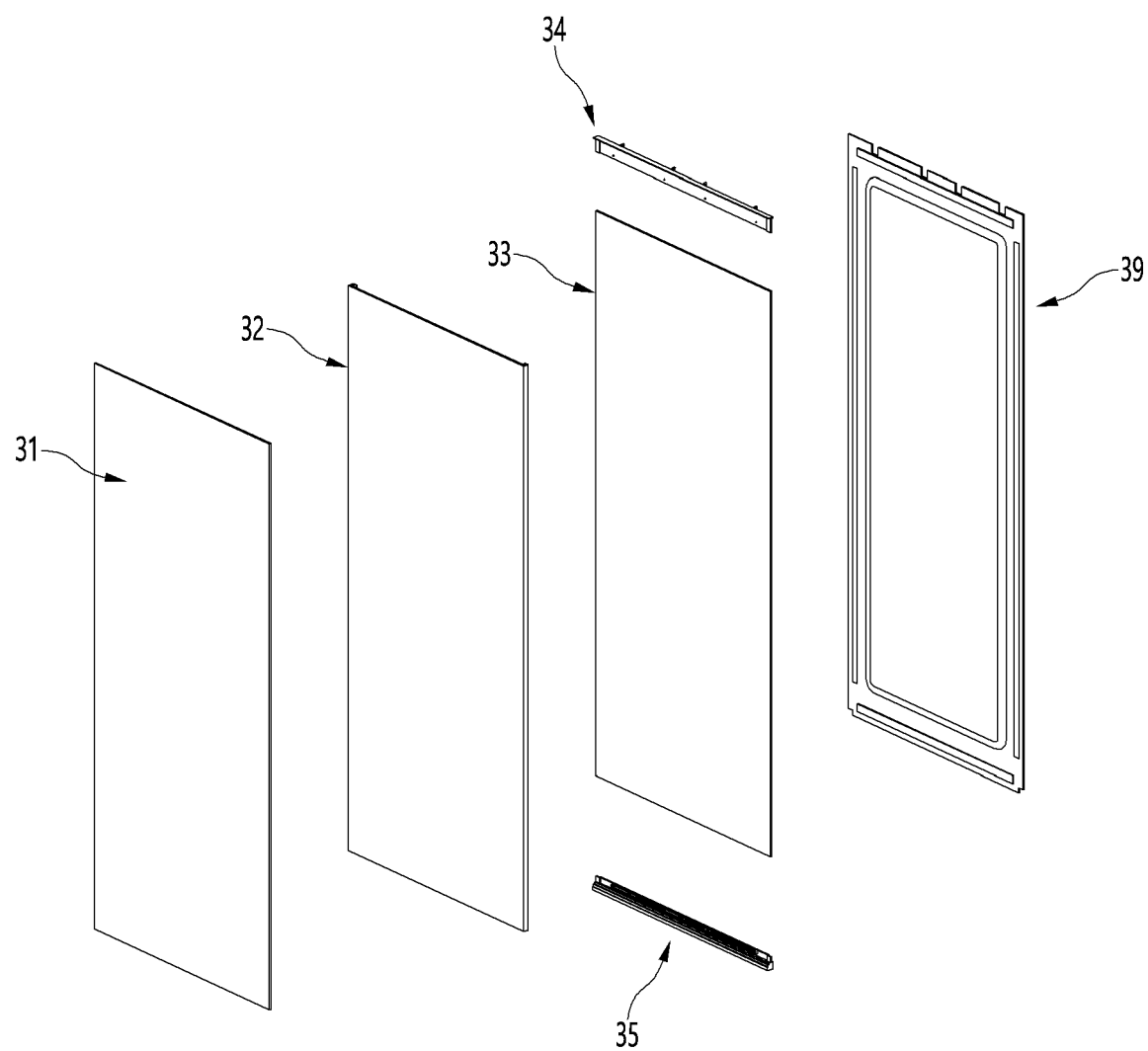
FIG. 5 is an exploded perspective view illustrating the panel assembly.
Figure 6:
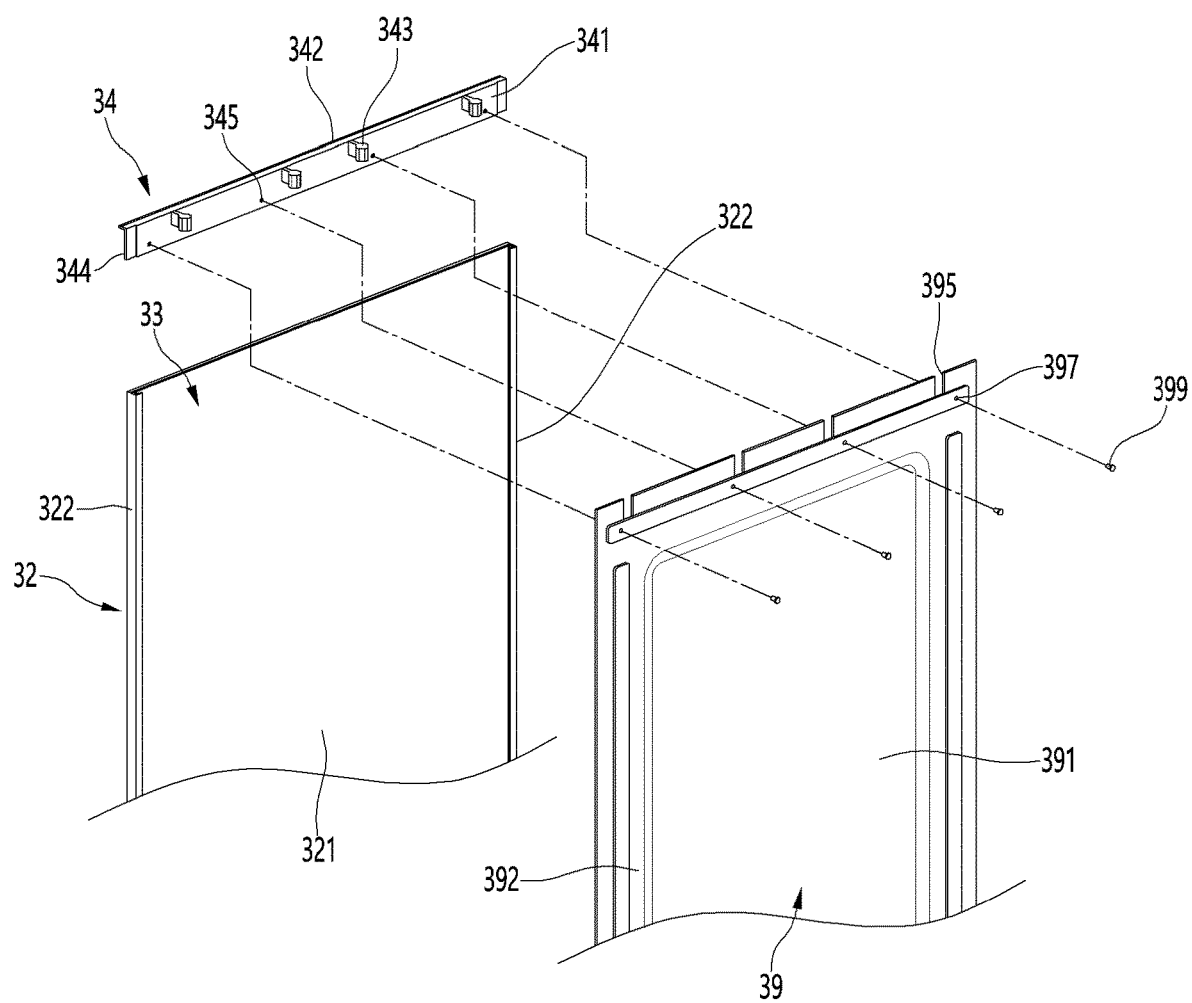
FIG. 6 is an exploded perspective view illustrating a state where the upper bracket, transparent member, and back cover constituting the panel assembly are separated from each other.
Figure 7:
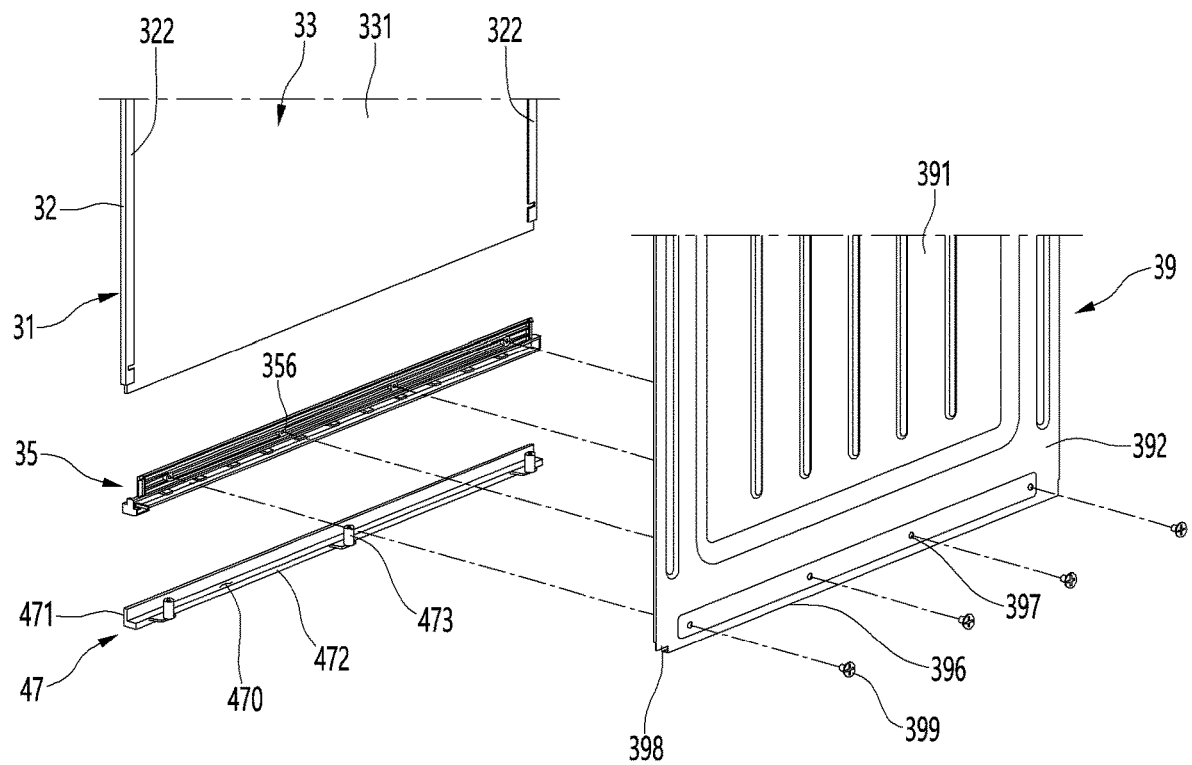
FIG. 7 is an exploded perspective view illustrating a state where the lower bracket, support member, plate supporter, and back cover constituting the panel assembly are separated from each other.

FIG. 4 is an exploded perspective view illustrating a state where the panel assembly and the door body constituting the door are separated from each other, FIG. 5 is an exploded perspective view illustrating the panel assembly, FIG. 6 is an exploded perspective view illustrating a state where the upper bracket, transparent member, and back cover constituting the panel assembly are separated from each other, and FIG. 7 is an exploded perspective view illustrating a state where the lower bracket, support member, plate supporter, and back cover constituting the panel assembly are separated from each other.

As illustrated in the drawing, the panel assembly 30 includes a front plate 31 that forms the outer appearance of the front surface, a lighting device 36 that radiates light so that the front plate 31 glows, and a light guide plate 33 that guides the light emitted from the lighting device 36.

The panel assembly 30 may include a member 32 mounted between the light guide plate 33 and the front plate 31.

Additionally, the panel assembly 30 may further include an upper bracket 34 and a lower bracket 35 that form the upper and lower surfaces of the panel assembly 30, respectively. The upper bracket 34 and the lower bracket 35 may also be referred to as brackets.

In addition, the lighting device 36 may be mounted on the lower bracket 35.

Additionally, the panel assembly 30 may further include a back cover 39 forming a rear surface.

Looking at this in more detail, the front plate 31 may be formed in a rectangular plate shape and may be made of a material capable of transmitting light. For example, the front plate 31 may be made of a glass material such as blue glass, white glass, or evaporated glass. Alternatively, the front plate 31 may be formed of another material capable of transmitting light, such as ABS, PMMA, PC, or the like. Additionally, the front plate 31 may also be referred to as a transparent plate or an out plate.

The front plate 31 may be transparent so that light reflected by the light guide plate 33 may be transmitted. Here, transparency may be defined as the degree to which light reflected from the light guide plate 33 may be transmitted and irradiated to the outside.

In addition, the front plate 31 may be formed to have a color, and may be formed to appear in different colors according to the operation or on-off state of the lighting device 36. For example, a specific pattern or design may be printed on the front plate 31 to have a specific color. In addition, a film printed with a pattern having a specific design or color is attached to the front plate 31, surface treatment such as imprinting, etching, initial printing, or the like is performed on the front plate, or a coating or deposition layer with a specific color and texture may be formed to shape the outer appearance of the front plate 31.

In addition, the front plate 31 may be configured to transmit light emitted from the lighting device 36 but not illuminate components behind the front plate 31. In other words, in the front plate 31, in a state where the lighting device 36 is turned off, by the color of the front plate 31 itself, it is possible to prevent components inside the panel assembly 30 from being visible to the outside through the front plate 31.

At this time, the front plate 31 may be formed to have a color with a brightness of 0 or more other than black in the off state. In other words, in a state where the refrigerator 1 is installed, the front surface of the refrigerator 1 may be displayed in a color other than black, and the color of the front surface of the refrigerator may be changed according to the operation of the lighting device 36.

Since the member 32 is mounted between the front plate 31 and the light guide plate 33, it may be called a support member. Alternatively, since the member 32 allows light to pass through, it may also be called a transmission member. Alternatively, since a structure including the side surfaces of the panel assembly 340 may be formed, it may also be called a frame.

Hereinafter, the member 32 will be described and referred to as a support member.

The light guide plate 33 may be located at the rear, spaced apart from the front plate 31 and may be configured to guide the light emitted from the lighting device 36 disposed below the light guide plate 33 to the front.

For example, the light guide plate 33 may be made of a transparent polymer material such as acrylic. Additionally, a diffusion agent that allows light incident on the light guide plate 33 to diffuse may be added to the light guide plate 33, or a pattern for light diffusion may be formed on the light guide plate 33. Therefore, light may be transmitted to the front plate 31 by the light guide plate 33, and at this time, the pattern of the light guide plate 33 may be set so that the entire front surface of the front plate 31 glows with uniform brightness.

The light guide plate 33 may be supported from the rear by the back cover 39 and may be fixed at a certain distance from the front plate 31 by the support member 32.

Meanwhile, a support member 32 may be provided between the front plate 31 and the light guide plate 33.

The support member 32 may correspond to the horizontal width of the front plate 31, and therefore, in a state where the front plate 31 is mounted, both left and right ends of the support member 32 and the front plate 31 may be located on the same plane. The support member 32 may form both left and right sides of the panel assembly 30.

The support member 32 is provided between the light guide plate 33 and the front plate 31 to maintain a constant distance between the light guide plate 33 and the front plate 31.

Additionally, the support member 32 may be formed so that the front surface thereof supports the front plate 31 and both sides thereof may constrain both ends of the light guide plate 33.

In detail, the support member 32 may include a plate-shaped front surface portion 321 on which the front plate 31 is mounted, and a side portion 322 formed on both left and right ends of the front surface portion 321 and on which the light guide plate 33 is mounted.

The front surface portion 321 may be formed in a plate shape corresponding to the front plate 31, and the front surface of the light guide plate 33 may be in close contact with the rear surface of the front surface portion 321.

Additionally, the side portion 322 extends rearward from both left and right ends of the front surface portion 321 and may be formed to restrain both left and right ends of the light guide plate 33.

Meanwhile, the support member 32 may be formed of a material capable of transmitting light, and may be formed entirely by injection or extrusion as a single structure. As an example, the support member 32 may be formed of a material such as ABC, polycarbonate (PC), or acrylic, and may allow light reflected from the light guide plate 33 to pass through the front plate 31.

A light diffusion agent may be added to the support member 32 during molding. The light diffusion agent may diffuse the light passing through the support member 32 and allow light to be irradiated more uniformly across the entire front plate 31.

In addition, the support member 32 may be entirely formed of a transparent or translucent material, and the support member 32 itself may be formed to have a color.

An upper bracket 34 may be provided at the upper end of the panel assembly 30. The upper bracket 34 may form the upper surface of the panel assembly 30. In addition, the upper bracket 34 may be injection-molded from a plastic material and may have a structure coupled to the support member 32 and a structure coupled to the back cover 39.

The upper bracket 34 may be coupled to the upper end of the support member 32 and may extend from the upper left end to the upper right end of the support member 32. The upper bracket 34 may be exposed through the upper surface of the panel assembly 30 in a state of being mounted.

The upper bracket 34 may overall include an upper bracket extension part 341 and an upper bracket upper surface portion 342.

The upper bracket extension part 341 is for mounting the upper bracket 34, is formed parallel to the front plate 31 and the light guide plate 33, and may extend in the vertical direction.

In addition, upper bracket mounting parts 344 that are stepped forward may be formed on both left and right ends of the upper bracket extension part 341. The upper bracket mounting part 344 may be formed to be stepped from the upper bracket extension part 341, and may be inserted into the open space at the upper end of the side portion 322 of the support member 32.

Additionally, the back cover 39 may be coupled to the rear surface of the upper bracket 34. For example, a plurality of upper protrusions 343 protruding backward may be formed on the rear surface of the upper bracket 34. Additionally, the back cover 39 may have a protrusion opening 395 cut to accommodate the upper protrusion 343 at a position corresponding to the upper protrusion 343. The upper protrusion 343 may be inserted into the protrusion opening 395, so that the upper bracket 34 and the back cover 39 may be coupled.

Additionally, an upper bracket screw hole 345 may be formed in the upper bracket extension part 341 for fastening the screw 399. The upper bracket screw hole 345 may be formed at a position corresponding to the cover screw hole 397. Accordingly, when the back cover 39 is mounted, the screw 399 may be fastened to sequentially pass through the cover screw hole 397 and the upper bracket screw hole 345.

Meanwhile, the back cover 39 forms the rear surface of the panel assembly 30 and may be combined with the upper bracket 34 and the lower bracket 35. The back cover 39 may be made of a metal material such as stainless steel or aluminum. In addition, the back cover 39 may be formed in a size corresponding to the size of the panel assembly 30 and may form the entire shape of the rear surface of the panel assembly 30.

The rear surface of the light guide plate 33 may be supported from the rear by a cover protrusion 391 protruding from the center of the back cover 39.

Of the cover peripheral part 392 forming the perimeter of the back cover 39, both left and right ends may be in contact with the side portion 322 of the support member 32, and the upper and lower ends of the cover peripheral part 392 may be in contact with the upper bracket 34 and the lower bracket 35, respectively.

A lower bracket 35 may be provided at the lower end of the panel assembly 30. The lower bracket 35 may form the lower surface of the panel assembly 30.

Additionally, the lower bracket 35 may be injection molded from a plastic material and may have a structure coupled to the support member 32 and a structure coupled to the back cover 39.

The lower bracket 35 may be coupled to the lower end of the support member 32 and may extend from the lower left end to the lower right end of the support member 32. The lower bracket 35 may be exposed through the lower surface of the panel assembly 30 in a state of being mounted.

Additionally, the back cover 39 may be coupled to the rear surface of the lower bracket 35. The back cover 39 may be coupled to the back cover 39 by fastening screws. Also, the rear surface of the light guide plate 33 may be supported on the front surface of the lower bracket 35. In other words, when the back cover 39 is coupled, the lower bracket 35 may support the light guide plate 33 from the rear.

Therefore, in the process of assembling the panel assembly 30, both left and right ends of the light guide plate 33 are fixed by the support member 32, and the upper and lower ends of the light guide plate 33 may be supported from the rear by the upper bracket 34 and the lower bracket 35.

Additionally, a lighting device 36 may be mounted on the lower bracket 35. The lighting device 36 emits light to determine the color of the front surface and brightness of the panel assembly and is configured to emit light toward the light guide plate 33.

The lighting device 36 may be provided inside the lower bracket 35, and may be assembled and installed together with the lower bracket 35 while being mounted on the lower bracket 35.

The portion including the lighting device 36 and the lower bracket 35 may be referred to as a lighting assembly.

The back cover 39 forms the rear surface of the panel assembly 30 and may be combined with the upper bracket 34 and the lower bracket 35. The back cover 39 may be made of a metal material such as stainless steel or aluminum. In addition, the back cover 39 may be formed in a size corresponding to the size of the panel assembly 30 and may form the entire shape of the rear surface of the panel assembly 30.

A cover bending part 396 bent forward may be formed at the lower end of the back cover 39. The cover bending part 396 may be inserted into the bracket opening 352a of the lower bracket rear surface portion 352 and may be in contact with the lower surface of the light supporter 37 that is in contact with the lighting device 36. Accordingly, heat generated when the lighting device 36 operates is conducted to the entire back cover 39 through the light supporter 37 and the cover bending part 396, thereby enabling effective heat dissipation.

Additionally, the cover opening 398 may be formed in the back cover 39. The cover opening 398 may be open to expose the protrusion guide 357 and the substrate protrusion 361b. For example, the cover opening 398 may be formed by cutting corner portions at the lower end and side ends of the back cover 39.

In addition, a plurality of screws 399 may be fastened along the upper end and lower end of the cover peripheral part 392, and the screws 399 penetrate the back cover 39 and is fastened to the upper bracket 34 and the lower bracket 35 so that the back cover 39 may be fixedly mounted.

Meanwhile, the panel assembly 30 may include a plate supporter 47. The plate supporter 47 may form the outer appearance of the lower end of the panel assembly 30 and may ensure that the lower end of the panel assembly 30 is fixed to the door body 40.

The plate supporter 47 may be made of a plastic material and may be coupled below the lower bracket 35 to shield the lower bracket 35. In other words, in a state where the panel assembly 30 is mounted on the door body 40, the lower bracket 35 is not exposed by the plate supporter 47 and may be coupled to the door body 40.

The plate supporter 47 may have a length corresponding to the length of the lower end of the panel assembly 30. Additionally, the plate supporter 47 may include a front surface 471 of the decoration and a lower surface of the decoration 472. A bracket mounting space 470 into which the lower bracket 35 is inserted and mounted may be formed by the front surface of the decoration 471 and the lower surface of the decoration 472.

The front surface of the decoration 471 covers the front surface of the lower bracket 35 and may extend to the lower end of the front plate 31. Additionally, the front surface of the decoration 471 may be exposed to the lower end of the front surface of the panel assembly 30.

The decoration lower surface 472 may support the lower bracket 35 from below. Although not illustrated in detail, a restraining groove may be further formed on the decoration lower surface 472 in which the restraining protrusion protruding from the lower surface of the lower bracket 35 is caught and restrained. Accordingly, the plate supporter 47 may be combined to cover the lower bracket 35 and form the lower end of the panel assembly 30.

In addition, the rear end of the decoration lower surface 472 may be provided with a lower protrusion 473 that extends rearward and then protrudes upward. The lower protrusion 473 may be coupled to the lower portion of the door body 40, and may maintain a state where the lower end of the panel assembly 30 is coupled to the door body 40.

This plate supporter 47 may also be referred to as a lower decoration in that it is placed at the lower end of the front plate 31.

Hereinafter, the structure in which the lighting device is mounted on the lower bracket will be described in detail.

Figure 8:
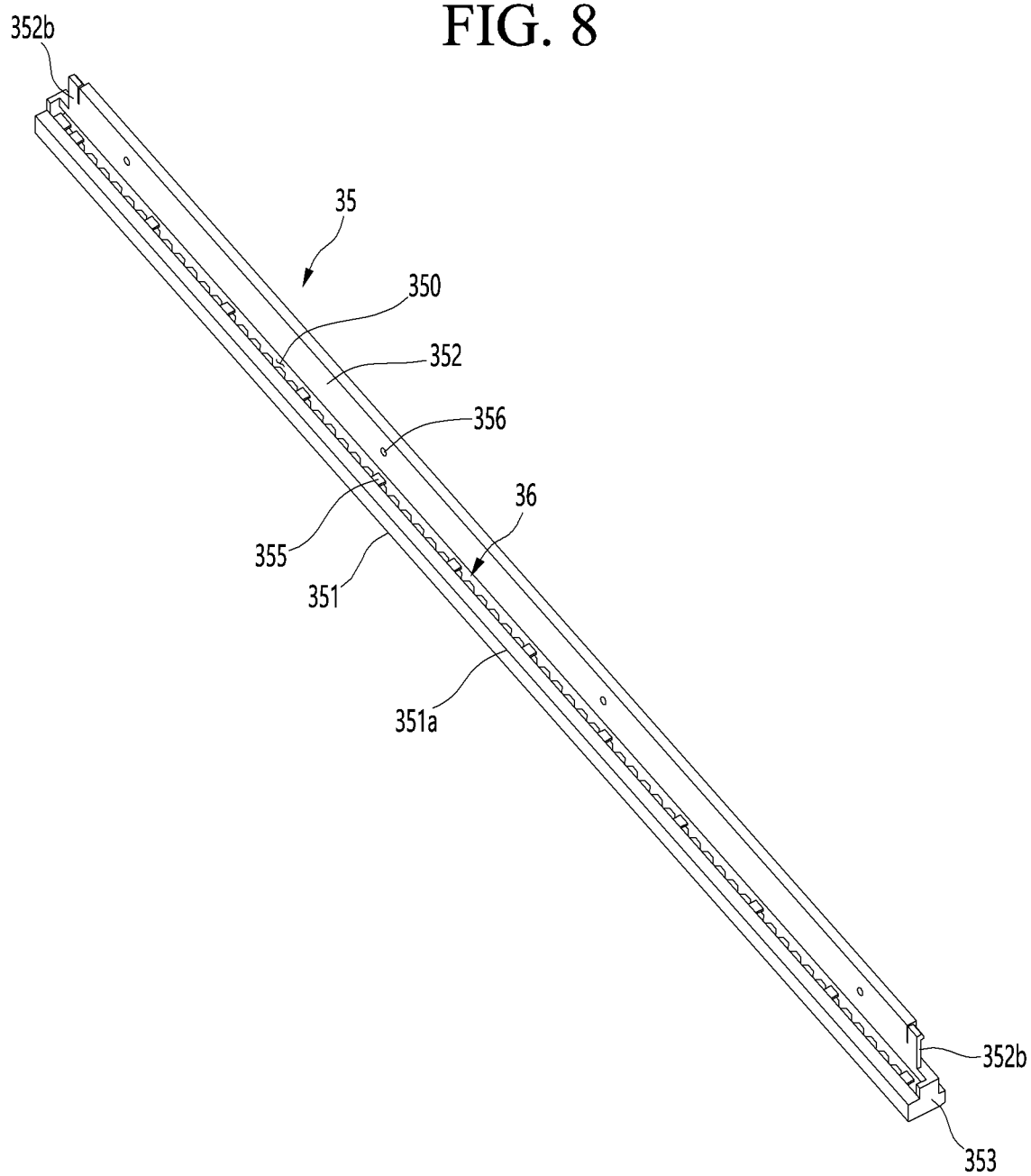
FIG. 8 is a perspective view illustrating a state where a lighting device is mounted on a lower bracket constituting the panel assembly.
Figure 9:
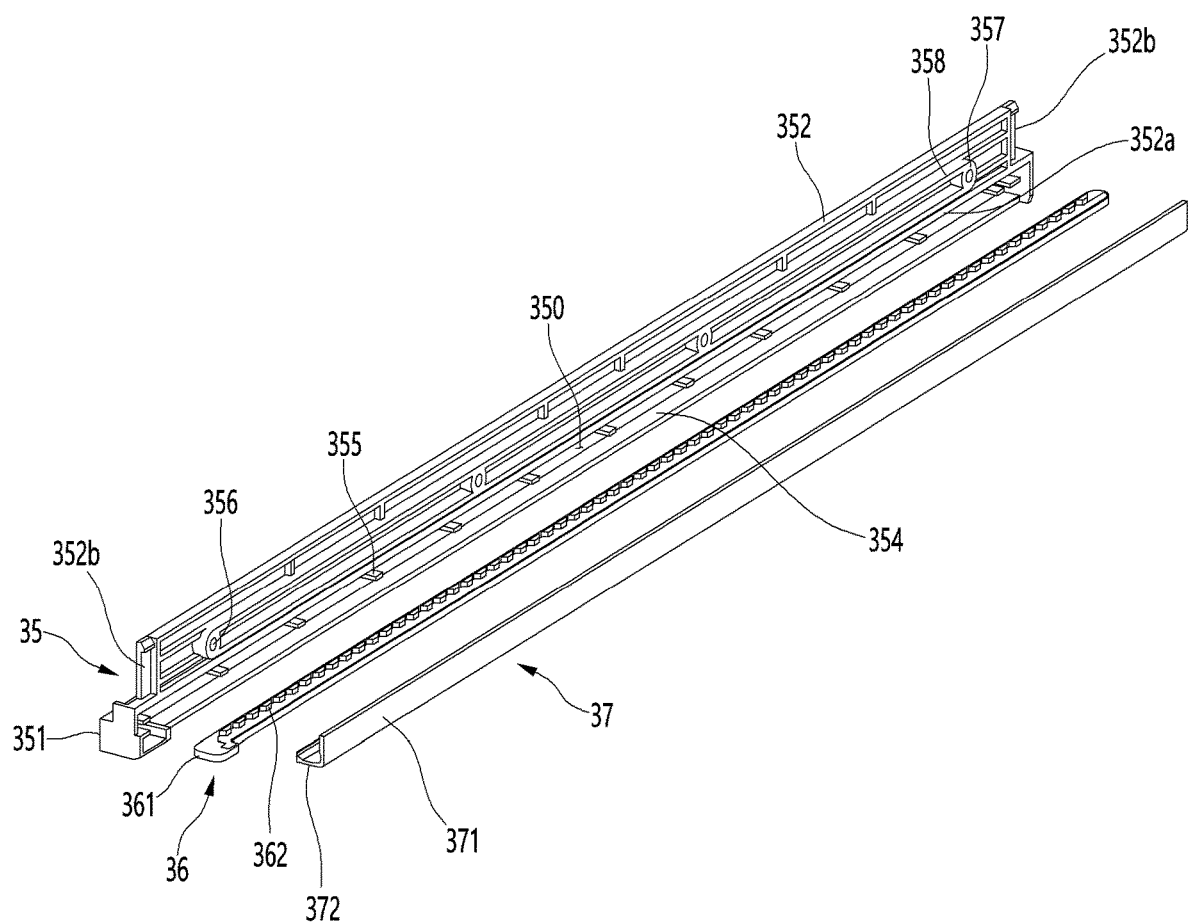
FIG. 9 is an exploded perspective view illustrating the lower bracket, lighting device, and light supporter.

FIG. 8 is a perspective view illustrating a state where a lighting device is mounted on a lower bracket constituting the panel assembly, and FIG. 9 is an exploded perspective view illustrating the lower bracket, lighting device, and light supporter.

The lower bracket 35 may support the lower ends of the front plate 31 and the light guide plate 33 in a state where the lighting device 36 is mounted.

The lower bracket 35 may have a length corresponding to the length of the panel assembly 30 in the left and right direction. The lower bracket 35 may overall include a lower bracket front surface portion 351, a lower bracket rear surface portion 352, a lower bracket side portion 353, and a lower bracket lower surface portion 354.

The lower bracket front surface portion 351 may form the front shape of the lower bracket 35 and may support a portion of the front plate 31.

A panel support part 351a is formed at the upper end of the lower bracket front surface portion 351 to support the lower end of the front plate 31.

The panel support part 351a may protrude more upward than the upper end of the light source of the lighting device 36 and may protrude at a set height to prevent the lighting device 36, especially the LED 362, from being exposed to the front. In addition, the panel support part 351a is capable of covering areas that may be caused by concentrated light irradiation at the lower end of the light guide plate 33 and the lower end of the front plate 31, which are very adjacent to the lighting device 36 and thus it is also possible to prevent lighting spots from being formed on the front plate 31.

Meanwhile, the lower bracket side portion 353 forms the side of the lower bracket 35 and may protrude more upward than the lower bracket front surface portion 351.

The lower bracket rear surface portion 352 may be formed at the rear end of the lower bracket side portion 353. The lower bracket rear surface portion 352 forms the rear surface of the lower bracket 35, and allows the lower bracket 35 to be fixedly mounted on the support member 32. Additionally, the lower bracket rear surface portion 352 is formed parallel to the front plate 31 and the light guide plate 33 and may extend in the vertical direction. The rear surface portion of the lower bracket 35 may protrude more upward than the lower bracket front surface portion 351 and the lower bracket side portion 353.

In addition, lower bracket mounting parts 352b that are stepped forward may be formed on both left and right ends of the lower bracket rear surface portion 352. The lower bracket mounting part 352b may be inserted into and mounted on the side portion 322. One end of the lower bracket mounting part 352b is cut, and the end portion of the lower bracket mounting part 352b is formed in a hook shape, so that it may be caught and restrained in the inner space of the side portion 322 when the lower bracket 35 is mounted.

In addition, a lower bracket screw hole 356 into which a plurality of screws 399 are fastened may be formed in the lower bracket rear surface portion 352.

The front surface of the lower bracket rear surface portion 352 is in contact with the rear surface of the light guide plate 33, so that the lower bracket 35 may support the lower end of the light guide plate 33 from the rear when the panel assembly 30 is assembled.

Meanwhile, a support rib 358 may be formed on the lower bracket rear surface portion 352 to connect a plurality of lower bracket bosses 357. A pair of the support ribs 358 may be disposed in a vertical direction, and a plurality of lower bracket bosses 357 may be positioned between the pair of support ribs 358.

Meanwhile, a bracket opening 352a may be formed in the lower bracket rear surface portion 352. The bracket opening 352a is formed at a position facing the lower bracket front surface portion 351, and may be formed to open at the rear surface of the accommodation space 350 where the lighting device 36 is mounted.

The bracket opening 352a extends from the left end to the right end of the lower bracket rear surface portion 352 and may be formed at a position facing the lower bracket front surface portion 321.

In addition, the bracket opening 352a may be located below the support rib 358. Additionally, the bracket opening 352a may be formed to open at the rear surface of the space where the lighting device 36 is mounted. In addition, the lower end of the bracket opening 352a may be located on the lower bracket lower surface portion 354. Accordingly, the lighting device 36 may be pulled in and out through the bracket opening 352a, and the light supporter 37 supporting the lighting device 36 may also be taken in and out together. Additionally, the bracket opening 352a may be covered by the light supporter 37 and the back cover 39.

The lower bracket lower surface portion 354 may form the lower surface of the lower bracket 35, and may be connected to the lower end of the lower bracket front surface portion 351, the lower end of the lower bracket side portion 353, and the lower end of the lower bracket rear surface portion 352. Additionally, the lower bracket lower surface portion 354 may form the bottom surface of the space where the lighting device 36 is mounted.

Meanwhile, a light guide plate support part 355 protruding rearward may be formed on the lower bracket front surface portion 351. A plurality of light guide plate support parts 355 may protrude rearward at regular intervals along the lower bracket front surface portion 351.

At this time, the light guide plate support part 355 may extend to restrain the lighting device 36 from above. The light guide plate support part 355 and the lower bracket lower surface portion 354 may restrict the lighting device 36 from above and below to restrict the upward and downward movement of the lighting device 36.

The upper surface of the light guide plate support part 355 may protrude to support the lower end of the light guide plate 33.

Meanwhile, a lighting device 36 may be provided inside the lower bracket 35. The lighting device 36 may include a substrate 361 and a light source 362. The substrate 361 may be formed in a plate shape that may be accommodated inside the lower bracket 35 and may extend from one end to the other end of the lower bracket 35. Additionally, a plurality of light sources 362 may be continuously disposed at regular intervals on the substrate 361.

The light source 362 may be disposed to emit light toward the lower end of the light guide plate 33. Additionally, the substrate 361 may provide a space where the light source 362 may be continuously disposed from the left end to the other side end of the light guide plate 33. In addition, the left and right ends of the substrate 361 come into contact with the lower bracket side portion 353 inside the lower bracket 35, so that flow in the left and right direction may be restricted.

The light source 362 may be composed of an LED, for example. In addition, the light source 362 may be composed of an RGB LED that may emit light of various colors according to the control of the controller. In other words, the light source 362 may emit light of various colors according to the control of the controller, and thus the front plate 31 may glow in the color set by the controller. Also, the color of the outer appearance of the front surface of the refrigerator 1 may be determined according to the color of the front plate 31.

Meanwhile, the light source 362 may be composed of an LED that emits light of a specific color in addition to the RGB LED, or may be composed of a combination of multiple LEDs that emit light of different colors. As an example, the plurality of light sources 362 may be composed of red, green, and blue LEDs and may be sequentially and repeatedly disposed. In addition, the operations of the light sources 362 may be combined according to the control of the controller to cause the front plate 31 to glow with a desired color.

Meanwhile, a light supporter 37 may be provided inside the lower bracket 35. The light supporter 37 may support the lighting device 36 inside the lower bracket 35. Additionally, the light supporter 37 may dissipate heat generated by the lighting device 36 through conduction.

Therefore, the light supporter 37 may also be called a heat dissipation member.

The light supporter 37 may be made of a metal material. As an example, the light supporter 37 may be made of aluminum material with high thermal conductivity. The light supporter 37 may be extruded from a metal material to have the same cross-sectional shape in the longitudinal direction, and may be sized to be pulled in and out through the bracket opening 352a.

The light supporter 37 may include a first supporting part 372 supporting the lighting device 36 and a second supporting part 371 in contact with the back cover 39.

A substrate support part 373 that supports the front and rear ends of the substrate 361 may be formed on the first supporting part 372. The substrate support part 373 may be formed to protrude upward along the front and rear ends of the first supporting part 372.

In addition, a supporter recessed part 374 is formed in the first supporting part 372, so that a space in which the elements on the lower surface of the substrate 361 are accommodated may be provided when the substrate 361 is supported by the first supporting part 372.

The second supporting part 371 may extend upward from the rear end of the first supporting part 372. The second supporting part 371 extends perpendicular to the first supporting part 372 and the lower bracket lower surface portion 354, and may cover at least a portion of the bracket opening 352a.

The rear surface of the second supporting part 371 is formed in a flat shape, and may be in surface contact with the back cover 39 when the back cover 39 is installed. Accordingly, the heat of the lighting device 36 conducted to the light supporter 37 may be transferred to the back cover 39 and dissipated through the back cover 39.

The lighting device 36 and the light supporter 37 may be entered and exited through the bracket opening 352a in a state where the lower bracket 35 is mounted. Accordingly, if only the back cover 39 that covers the bracket opening 352a is separated, the lighting device 36 and the light supporter 37 may be easily assembled and disassembled.

Meanwhile, it may also be referred to as a lighting assembly including the lighting device 36, the lower bracket 35, and the light supporter 37.

The light generated by the lighting device 36 may illuminate the front plate 31 uniformly by the light guide plate 33. Hereinafter, the front plate 31 will be described in detail.

Figure 10:
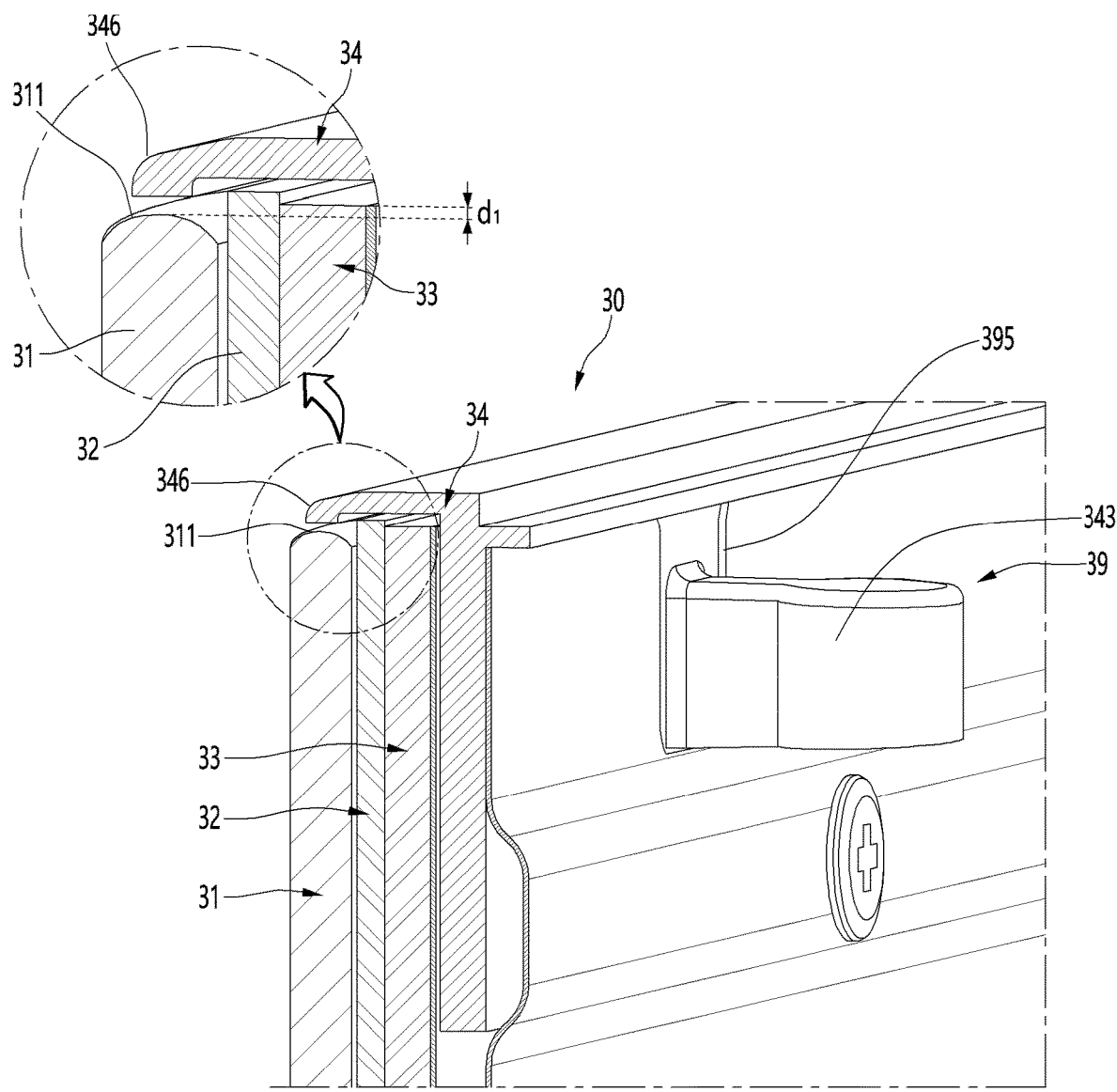
FIG. 10 is a cross-sectional view taken along line X-X' in FIG. 4.
Figure 11:
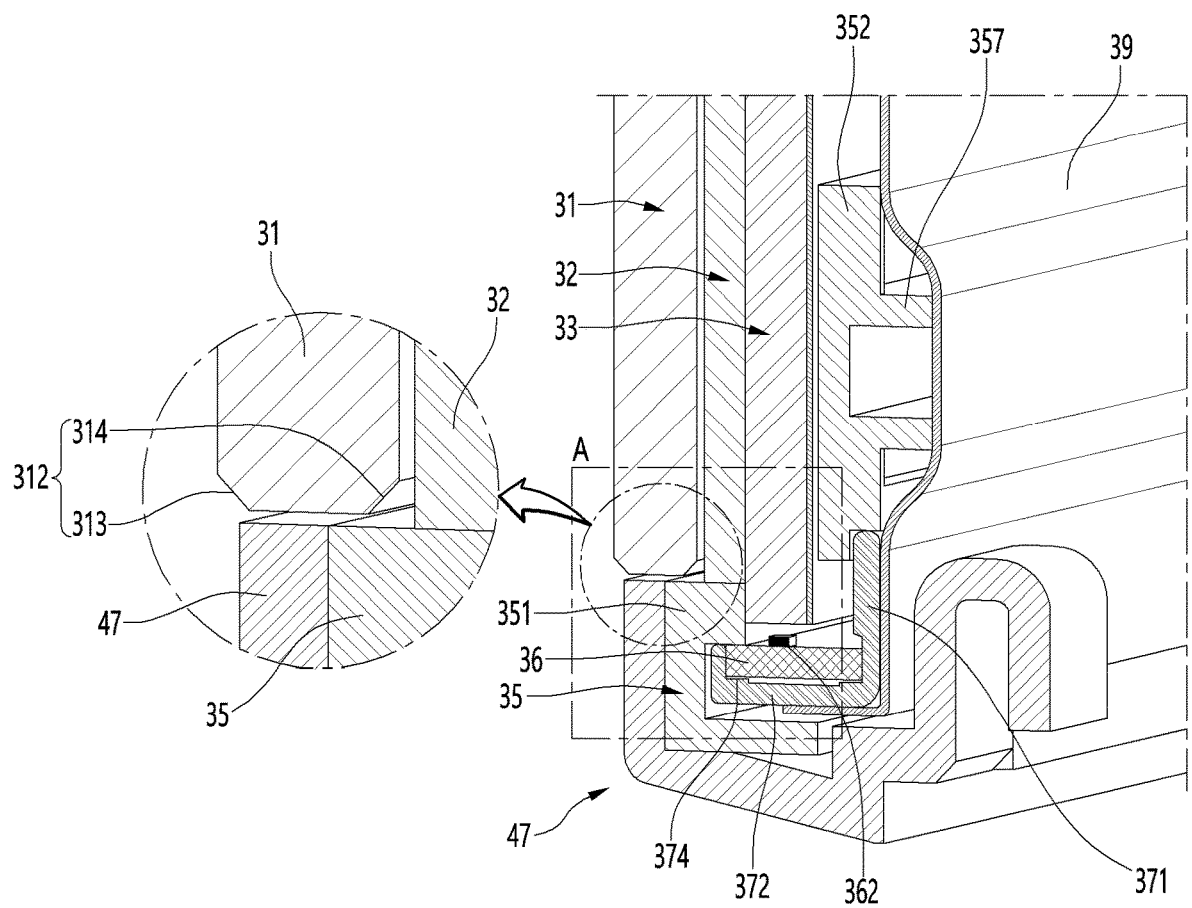
FIG. 11 is a cross-sectional view taken along line XI-XI' in FIG. 4.
Figure 12:
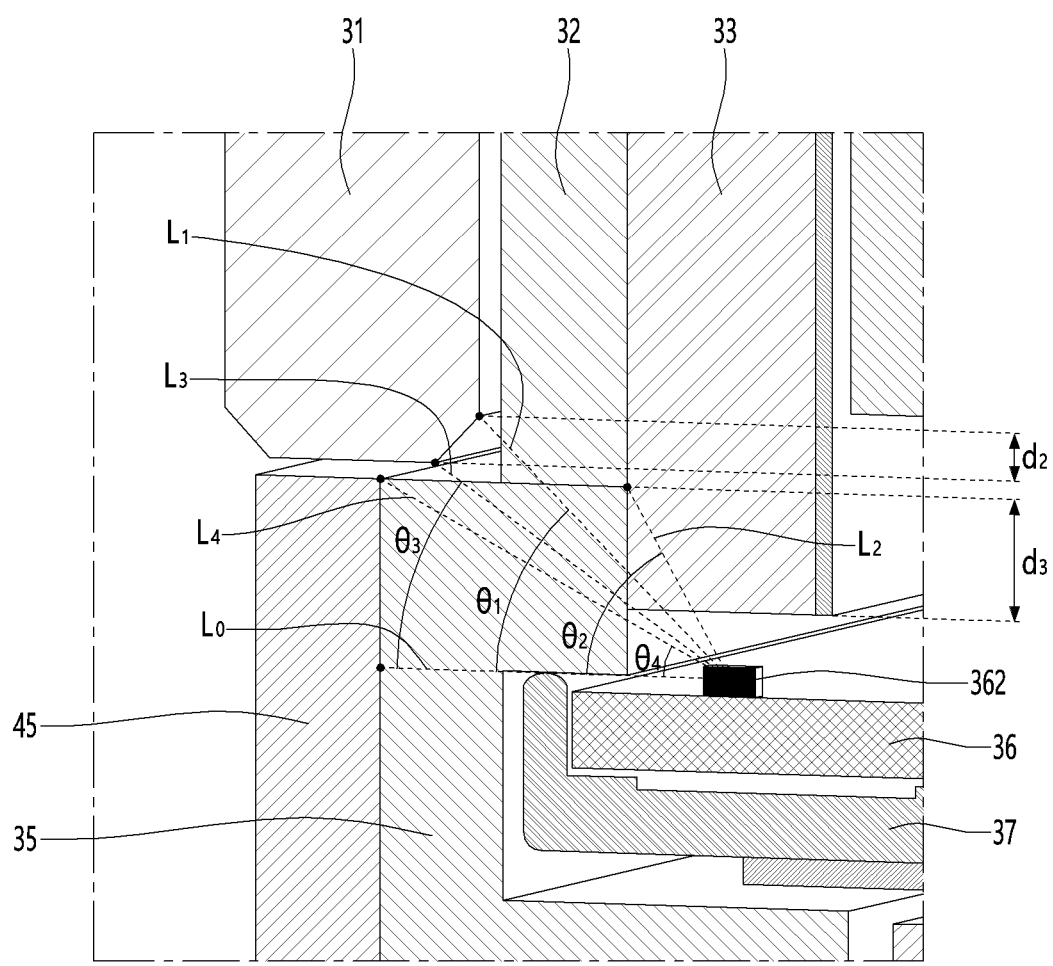
FIG. 12 is an enlarged view illustrating part A of FIG. 11.

FIG. 10 is a cross-sectional view taken along line X-X' in FIG. 4, FIG. 11 is a cross-sectional view taken along line XI-XI' in FIG. 4, and FIG. 12 is an enlarged view illustrating part A of FIG. 11.

The front plate 31 may be formed in a square plate shape to correspond to the size of the front surface of the panel assembly 30 exposed to the outside.

In addition, the outer appearance of the front surface of the door may be formed by the front plate 31. In other words, the entire front surface of the panel assembly 30 is provided so that the front plate 31 covers it, so that components other than the front plate 31 are not visually visible from the front surface. Accordingly, it is possible to form a large screen by maximizing the area through which light is transmitted in the front plate 31.

The upper end of the front plate 31 may be fixed to the upper bracket 34. Additionally, the rear surface of the front plate 31 may be supported by the support member 32, and the lower end may be supported by the plate supporter 47.

Meanwhile, the upper bracket 34 may be formed to surround the upper surfaces of the front plate 31, the support member 32, and the light guide plate 33, and may form the upper surface of the panel assembly 30. In addition, the upper bracket 34 is in contact with the upper surface of the front plate 31 and may support the upper end of the front plate 31.

At this time, the front and rear ends of the upper surface of the front plate 31 may each include a rounded curved surface portion 311.

In other words, the outermost end portion of the upper end of the front plate 31 may include a curved surface portion 311 formed into a curved surface by connecting the front and rear surfaces in a rounded manner. In other words, the upper surface of the front plate 31 may be formed as a rounded curved surface. In detail, the front and rear ends of the upper surface of the front plate 31 may each be formed in a rounded shape.

Additionally, the upper surface of the front plate 31 may be formed with a curved surface portion 311 that is convex upward. The curved surface portion 311 is formed in a rounded shape with a gentle curvature at the end portion of the front plate 31, thereby preventing cracks from occurring in the front plate 31 due to external impacts or the like.

The upper bracket 34 may be in contact with the front plate 31 and may have a structure for fixing the front plate 31. For example, the front end portion of the upper bracket 34 may include a bracket inclined part 346 that is inclined downward toward the front. The bracket inclined part 346 may be formed to be in contact with the upper end of the curved surface portion 311.

The support member 32 and the light guide plate 33 may be provided behind the front plate 31. Additionally, the support member 32 may be located higher than the upper end of the front plate 31. In other words, the size of the front surface of the support member 32 may be larger than the size of the front surface of the front plate 31.

In a state where the front plate 31, the support member 32, and the light guide plate 33 are fixed to the upper bracket 34, the uppermost end of the curved surface portion 311 may be located further below the upper surface of the light guide plate 33 and the support member 32. Accordingly, when viewed from the front of the front plate 31, a portion of the upper ends of the support member 32 and the light guide plate 33 may be fixed to the upper bracket 34 in a state of protruding upward.

The light guide plate 33 is disposed behind the support member 32, and the upper end of the light guide plate 33 may be positioned higher than the upper end of the curved surface portion 311 of the front plate. In other words, the size of the front surface of the light guide plate 33 may be larger than the size of the front surface of the front plate 31.

To explain this differently, the front or rear end of the curved surface portion 311 may be provided further below the upper end of the support member 32 or the light guide plate 33. Additionally, the front and rear ends of the curved surface portion 311 may correspond to the height of the upper end of the back cover 39 or may be provided further below the upper end of the back cover 39.

The upper end portion of the front plate 31 is preferably formed with a curved surface portion 311 to reinforce the strength of the front plate 31 and prevent cracks due to external impacts.

In particular, the panel assembly 30 is coupled to the door body 83 in a state where the upper surface thereof is formed by the upper bracket 34, so that the upper bracket 34 forms a part of the upper surface of the door. Accordingly, at least a portion of the upper bracket 34 may be exposed to the outside through the upper surface of the door. At this time, it is desirable that the end portion of the front plate 31 includes a curved surface portion 311 formed in a rounded shape to prevent cracks from occurring.

If the upper end of the front plate 31 and the upper end of the light guide plate 33 are disposed on the same horizontal extension line, the light dispersed by the light guide plate 33 may interfere with the curvature of the curved surface portion 311, resulting in dark areas or shadows in some areas.

The upper end of the curved surface portion 311 may be spaced downward from the upper end of the light guide plate 33 by a set length d1.

In other words, the upper end of the light guide plate 33 may be extended so that the upper end of the light guide plate 33 may be positioned higher than the upper end of the curved surface portion 311. Accordingly, the amount of light diffused from the light guide plate 33 to the front plate 31 may be increased. Therefore, the amount of light that may be lost due to interference with the curved surface portion 311 may be compensated for by the upper end portion of the extended light guide plate 33, so that the entire upper end of the front plate 31 may glow uniformly.

Meanwhile, at least a portion of the lower surface of the front plate 31 is disposed to be in contact with the upper surface of the plate supporter 47, so that the lower end may be supported by the plate supporter 47. Additionally, at least a portion of the lower surface of the front plate 31 may be in contact with the lower bracket 35.

Additionally, a lighting device 36 may be placed at the rear of the lower end portion of the front plate 31 in a state of being mounted on the lower bracket 35. The light emitted from the lighting device 36 may be diffused by the light guide plate 33, and the light dispersed from the light guide plate 33 may pass through the front plate 31 to form the color of the front surface of the door.

The lower end of the front plate 31 may be disposed on the same extension line as the lower end of the support member 32 in the horizontal direction.

Also, the lower end of the front plate 31 may be located higher than the lighting device 36. In detail, the lower end of the front plate 31 may be located higher than the light source 362 of the lighting device 36.

At least a portion of the lower end of the front plate 31 may be supported by the front surface portion 351 of the lower bracket 35. Additionally, the lighting device 36 may be placed further lower than the upper end of the front surface portion of the lower bracket 35.

With this structure, a portion of the light generated from the lighting device 36 may be covered by the front surface portion 351 of the lower bracket. Accordingly, it is possible to prevent a hot spot phenomenon glowing around the light source of the lighting device 36 from being observed in front of the front plate 31.

In addition, the lower end of the light guide plate 33 may be provided upward and adjacent to the light source of the lighting device 36 and may be located lower than the lower end of the front plate 31. In other words, the total area forming the front surface of the light guide plate 33 may be larger than the total area forming the front surface of the front plate 31. Accordingly, there is an advantage of efficiently diffusing the light emitted from the light source and securing a sufficient amount of light reflected to the front plate 31.

Meanwhile, at this time, unlike the upper end portion of the front plate 31, the corner of the lower end portion of the front plate 31 may be formed as an inclined surface rather than a curved surface. In other words, the front plate 31 may have an inclined part 312 formed on the lower surface thereof. The inclined part 312 may be formed at the front or rear end of the lower surface of the front plate 31.

In detail, this inclined part 312 may be formed at the front or rear end of the lower surface of the front plate 31. In other words, the front end of the lower surface of the front plate 31 may be formed with a front end inclined part 313 that slopes upward toward the front. Additionally, a rear end inclined part 314 that slopes upward toward the rear may be formed at the rear end of the lower surface of the front plate 31.

In particular, the inclined part 314 may be formed at a position corresponding to the direction in which the light source 362 is arranged at the end portion of the front plate 31. In other words, the inclined part 314 may be located at an end portion of the front plate 31 that faces an imaginary line in the direction in which the light source 362 is arranged.

In other words, when the inclined part 314 may be formed at the rear end of the lower surface of the front plate 31, the entire lower end portion of the front plate 31 may uniformly glow by the light emitted from the lighting device 36.

The inclined part 314 may be provided at a position adjacent to the front plate 31, the lower bracket 35, and the end portion of the support member 32. Due to the inclined part 314, a portion of the space formed by the front plate 31, the support member 32, and the lower bracket 35 may be formed as an inclined surface.

If the lower end portion of the front plate 31 is formed as a curved surface, light reflected from the light guide plate 33 may be diffusely reflected by the curved surface and may not be incident on the front plate 31. As a result, a dark part or shadow appears at the lower end portion of the front plate 31, which appears darker than the entire front plate 31. The lower end portion of the front plate 31 may glow uniformly as a whole, including an inclined part 312 in which an inclined surface is formed by cutting the corner of the lower end portion of the front plate 31 at an angle.

The area where the inclined part 312 is formed may be formed to a level where an area in which the front plate 31 may be sufficiently supported by the plate supporter 47 is secured and at the same time, the strength of the front plate 31 is not reduced.

For example, the lower surface of the front plate 31, excluding the inclined part 312, may be formed to have a size corresponding to the upper surface of the plate supporter 47.

The upper end of the inclined part 312 may be formed so that an angle θ1 formed between the first imaginary line L1 connected from the center of the light source 362 to the upper end of the inclined part 312 and the horizontal line L0 may be formed at an angle smaller than the angle θ2 formed between the second virtual line L2 connected from the center of the light source 362 to the lower end of the rear surface of the support member 32 and the horizontal line L0.

In addition, the lower end of the inclined part 312 may be formed so that the angle θ3 formed between the third virtual line L3 connected from the center of the light source 362 to the lower end of the inclined part 312 and the horizontal line L0 may be formed at an angle greater than the angle θ4 formed between the fourth imaginary line L4 connected from the center of the light source 362 to the front end of the upper surface of the lower bracket front surface portion 351 and the horizontal line L0.

Here, the horizontal line L0 refers to a horizontal line extending from the center of the light source in the direction where the plate supporter 47 is located. The horizontal line L0 refers to an imaginary line extending from the center of the light source in a direction parallel to the lower surface of the front plate 31.

Within this range, there is an advantage in that dark parts may be prevented as much as possible from occurring at the lower end portion of the front plate 31.

In addition, the vertical distance d2 from the lower end to the upper end of the inclined part 312 may be formed to be shorter than the distance d3 at which the lower end portion of the light guide plate 33 is inserted from the upper end of the front surface portion 351 of the lower bracket 35. The amount of light interfered by the inclined part 312 may be compensated for by the amount of light reflected by the extended part of the lower end portion of the light guide plate 33 by the light reflected from the light guide plate 33. Therefore, there is an advantage that the entire lower end portion of the front plate 31 may glow uniformly.

Meanwhile, at least a portion of the lower surface of the front plate 31 is supported by the plate supporter 47, so that cracks may be less likely to occur due to external impact than the upper end portion of the front plate 31. In other words, since the lower end portion of the front plate 31 has a structure supported by at least the plate supporter 47 and the lower bracket 35, even if the inclined part 312 is formed, the strength of the lower end portion of the panel assembly 30 does not decrease significantly. In other words, there is an advantage in that cracks may be prevented from occurring in the front plate 31 by the plate supporter 47.

Additionally, the shape of the front plate 31 may be provided in various forms, including the first embodiment including the inclined part 312 described above.

Hereinafter, various embodiments of the front plate 31 in which light emitted by the lighting device 36 may glow uniformly throughout will be described.

Figure 13:
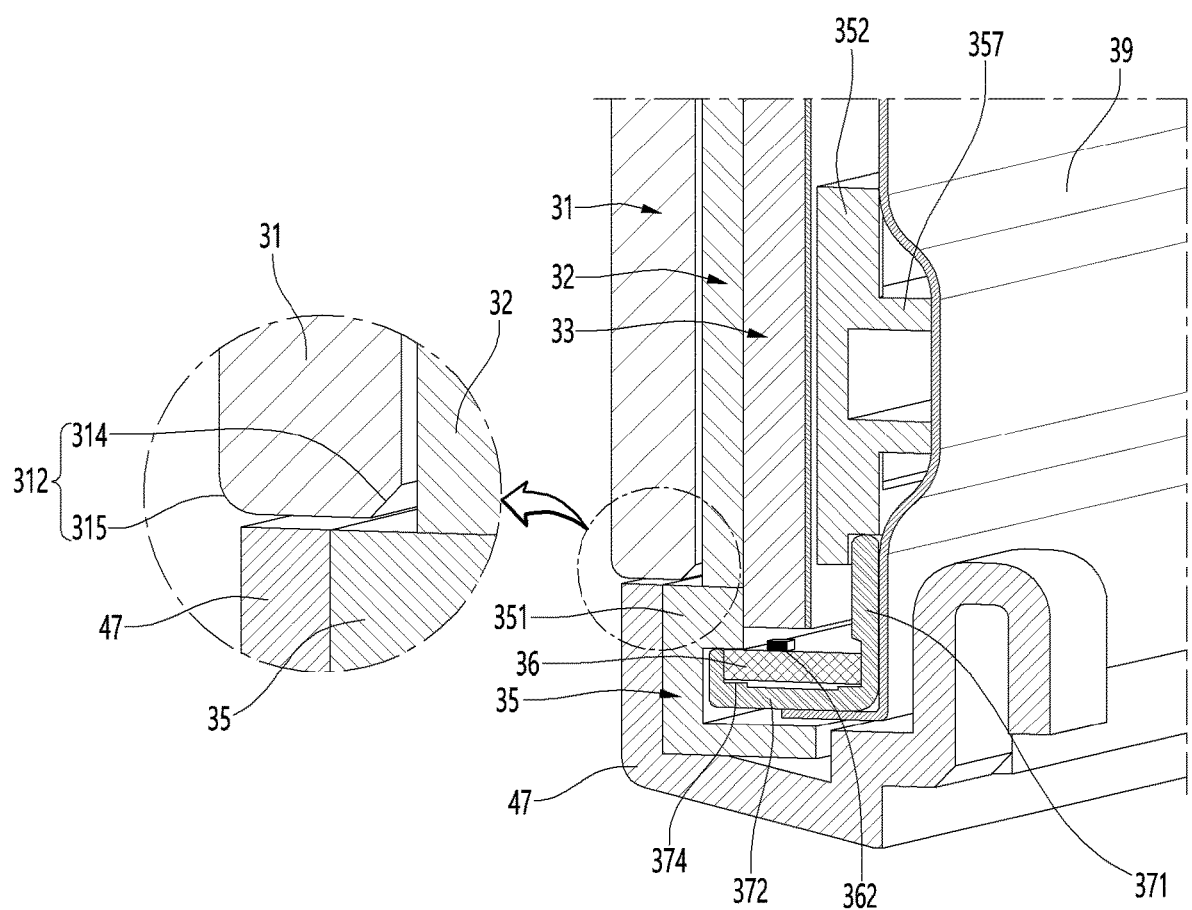
FIG. 13 is a cross-sectional view illustrating a door panel combined with a front plate according to the second embodiment.

FIG. 13 is a cross-sectional view illustrating a door panel combined with a front plate according to the second embodiment.

As illustrated in FIG. 13, the front plate 31 according to the second embodiment of the present disclosure may be formed in the same manner as the front plate of the first embodiment described above, except for a lower end curved surface portion 315 of a curved shape formed at the front end of the lower surface and an inclined part 312 formed at the rear end of the lower surface.

In detail, the front end of the lower surface of the front plate 31 according to the second embodiment may be formed in a shape corresponding to the curved surface portion 311 formed at the upper end of the front plate 31. The lower end curved surface portion 315 may be formed in a convex shape so that the front end is located above the lower end.

Additionally, the rear end of the lower surface of the front plate 31 may be formed in the same manner as the inclined part 312 of the first embodiment. In this case, the rear end of the lower surface of the front plate 31 is formed with an inclined part 312, which may improve the phenomenon of the front plate 31 appearing partially dark compared to a case where the corners are formed in a curved shape.

In addition, as the curved surface portion 311 is formed at the front end of the front plate, the strength of the front plate is strengthened, which has the advantage of preventing the front plate from being damaged or cracking due to external impact.

Figure 14:
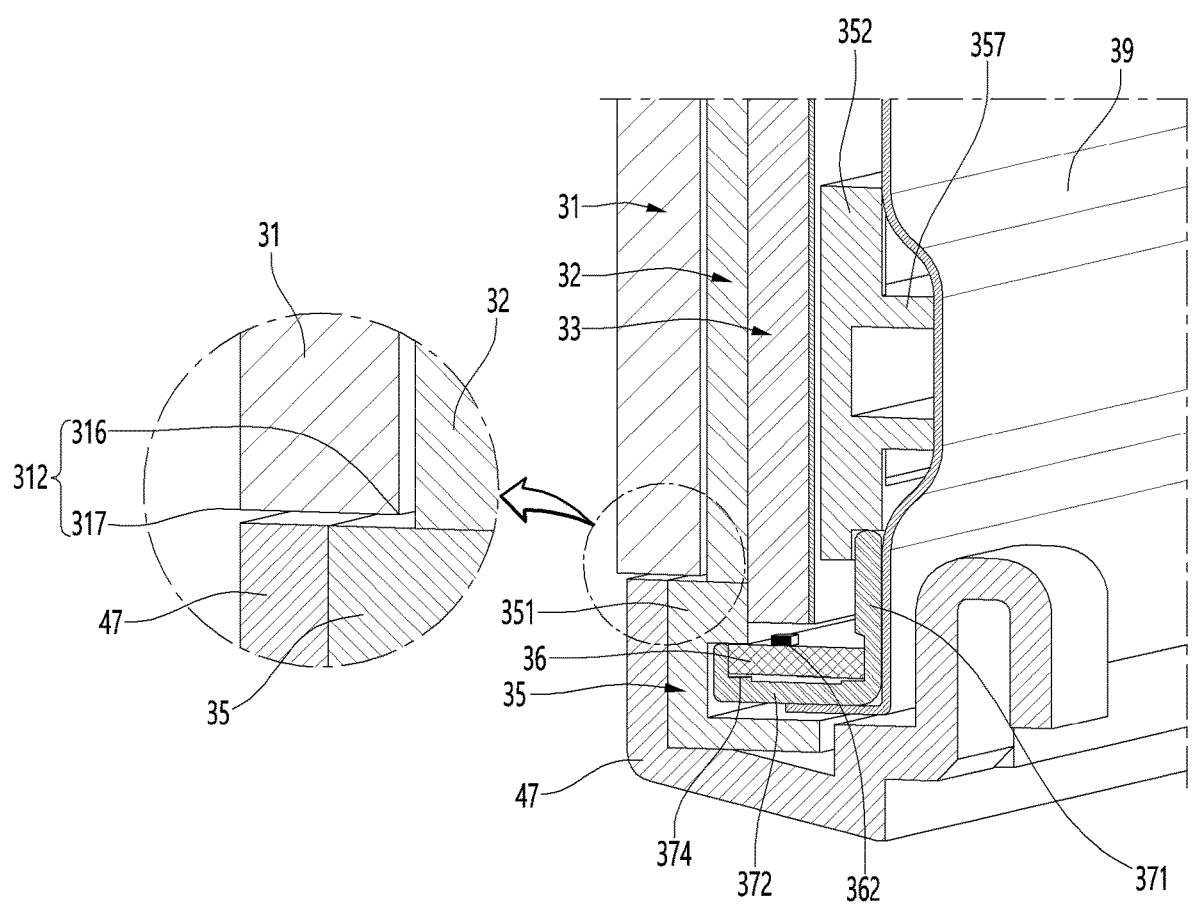
FIG. 14 is a cross-sectional view illustrating a door panel combined with a front plate according to the third embodiment.

FIG. 14 is a cross-sectional view illustrating a door panel combined with a front plate according to the third embodiment.

As illustrated in FIG. 14, the front plate 31 according to the third embodiment of the present disclosure may be formed in the same manner as the front plate of the first embodiment described above except that the lower surface and the front surface are formed perpendicular to each other and the lower surface and the rear surface of the front plate 31 are formed perpendicular to each other.

In other words, the front plate 31 according to the third embodiment includes right angle portions 316 and 317 on the lower surface of which the front and rear surfaces are vertically connected, respectively. By the right angle portion 316, the end of the lower end portion of the front plate 31 may be in contact with the end of the lower end portion of the support member 32.

Additionally, the front end of the front plate 31 may be located on the same extension line as the front end of the plate supporter 47 in the vertical direction. Alternatively, the front end of the front plate 31 may be formed to protrude further forward than the front end of the plate supporter 47. Also, at least a portion of the rear end of the lower surface of the front plate 31 may be in contact with the lower bracket 35.

The front plate 31 according to the third embodiment has a right angle portion 316 formed at the corner portion of the lower end portion and is formed in maximum contact with the plate supporter 47, the lower bracket 35, and the support member 32 and thus the formation of an air layer between the front plate 31 and the support member 32 may be minimized.

When this air layer is formed, a light glowing phenomenon may be exposed in front of the front plate 31 as the light emitted by the lighting device 36 passes through the air layer. Accordingly, including the right angle portion 316, the front plate 31, the support member 32, and the lower bracket 35 are brought into surface contact to remove an air layer. Accordingly, there is an advantage in that the right angle portion 316 prevents light glowing phenomenon from being exposed in front of the front plate 31 and allows the front plate 31 to glow uniformly as a whole.

Figure 15:
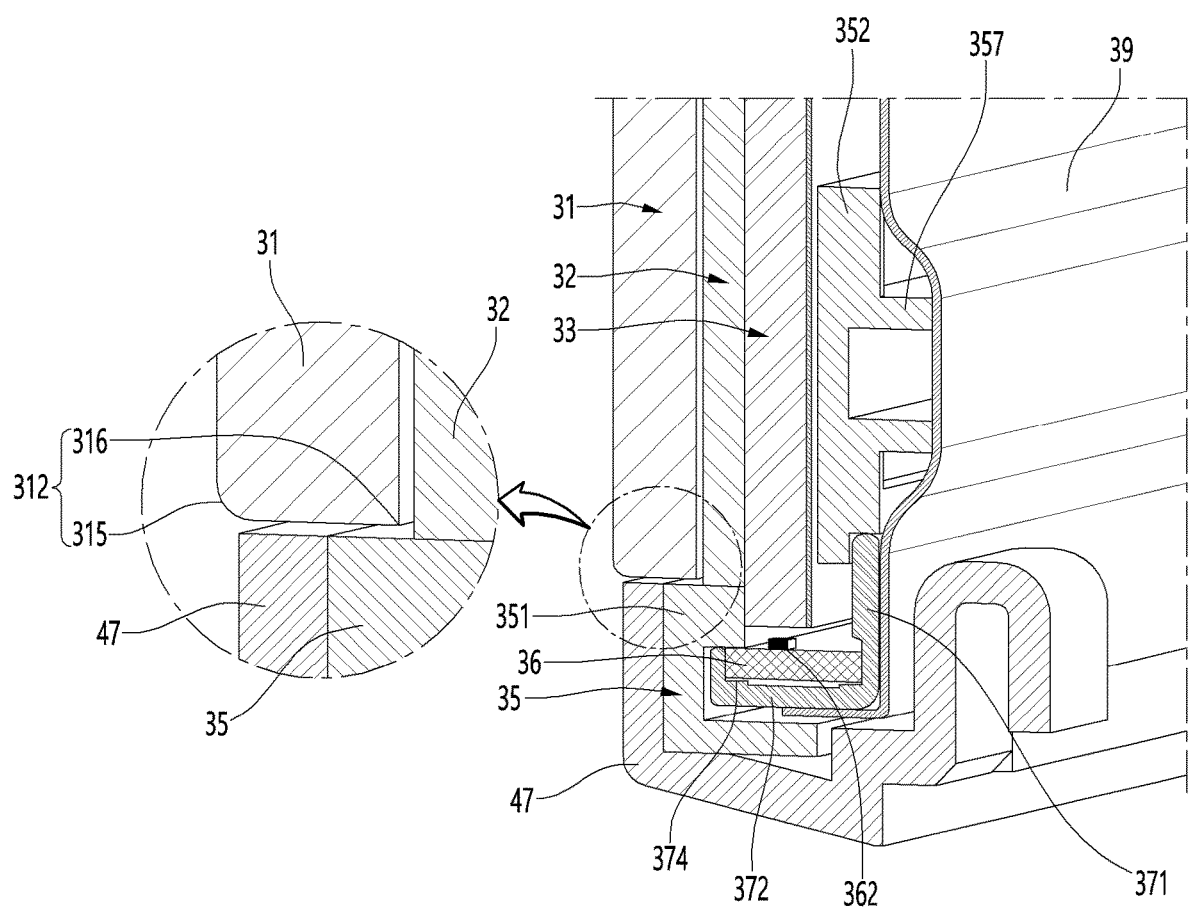
FIG. 15 is a cross-sectional view illustrating a door panel combined with a front plate according to the fourth embodiment.

FIG. 15 is a cross-sectional view illustrating a door panel combined with a front plate according to the fourth embodiment.

As illustrated in FIG. 15, the front plate 31 according to the fourth embodiment of the present disclosure may be formed in the same manner as the front plate of the first embodiment described above, except for a lower end curved surface portion 315 of the curved shape formed at the front end of the lower surface and a right angle portion 316 formed at the rear end of the lower surface.

The front end of the lower surface of the front plate 31 according to the fourth embodiment may be formed in a shape corresponding to the curved surface portion 311 formed only on the upper end of the front plate 31. The lower end curved surface portion 315 may be formed in a convex shape so that the front end is located above the lower end.

Additionally, the rear end of the lower surface of the front plate 31 may be formed in the same manner as the right angle portion 316 of the third embodiment.

In this case, the front plate 31 may remove an air layer that may be formed between the front plate 31 and the support member 32 and the lower bracket 35 by the right angle portion 316. Therefore, compared to the front plate 31 formed with a curvature, the light glowing phenomenon or dark parts occurring may be improved.

In addition, a curved surface portion 311 is formed at the front end of the lower surface of the front plate, which has the advantage of reinforcing the strength of the front plate and preventing the front plate from being damaged or cracking due to external impacts.

Hereinafter, the operation of the refrigerator 1 and the panel assembly 30 having the above structure will be examined in more detail with reference to the drawings.

Figure 16:
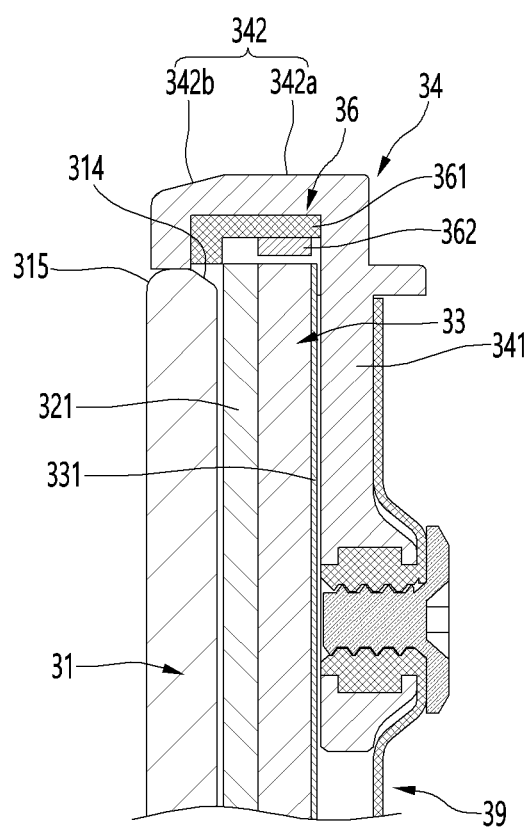
FIG. 16 is a cross-sectional view illustrating another embodiment of the panel assembly.

FIG. 16 is a cross-sectional view illustrating another embodiment of the panel assembly.

In the panel assembly according to another embodiment of the present disclosure, the lighting device 36 may be disposed on the upper portion of the panel assembly 30.

The panel assembly 30 described above was described as having the lighting device 36 located at the lower part of the panel assembly 30. However, the present disclosure is not limited to the lighting device 36 being located below the panel assembly 30.

As illustrated in FIG. 16, a lighting device 36 equipped with the light source 362 may be provided above the light guide plate 33. Light generated from the light source 362 may be transmitted from top to bottom by the light guide plate 33, and may transmit through the front plate 31 to brightly illuminate the front surface of the door.

Although not illustrated in detail in the drawing, the lighting device 36 may be provided in the space between the upper bracket 34 and the light guide plate 33. Additionally, if necessary, it may be provided below the upper bracket 34 while being mounted on the lower bracket 35 described above.

In this case, an inclined part 314 may be formed on a corner facing the light source 362 at the upper end of the front plate 31.

The inclined part 314 may be formed at an end portion of the front plate 31 parallel to the direction in which the light source 362 is arranged. Specifically, the inclined part 314 may be formed at the end portion of the upper end of the rear surface of the front plate 31.

If the corner surface of the front plate 31 facing the direction in which the light source 362 is arranged is curved, shadows may appear due to diffuse reflection caused by the curved surface. By removing the rounded area by the inclined part 314, it is possible to prevent shadows from appearing at the outermost end portion of the front plate 31.

Additionally, the rear end of the upper surface of the front plate 31 may be formed with the above-mentioned right angle portion instead of the inclined part 314.

In addition, at the upper end of the front plate 31, the front end corner portion may be formed as a round portion 315. The strength may be reinforced by the round portion 315, and it is possible to prevent the front plate 31 from being damaged or the worker from being injured by the corner portion during the process of assembling the panel assembly.

Additionally, the inclined part 314 may be formed at the front end of the upper surface of the front plate 31, and the above-described right angle portion may be formed instead of the inclined part 314.

Meanwhile, the top of the front plate 31 may be located lower than the light source 362. Also, the top of the front plate 31 may be located lower than the top of the light guide plate 33. With this structure, the light emitted from the light source 362 may glow more uniformly over the entire area of the front plate 31.

Figure 17:
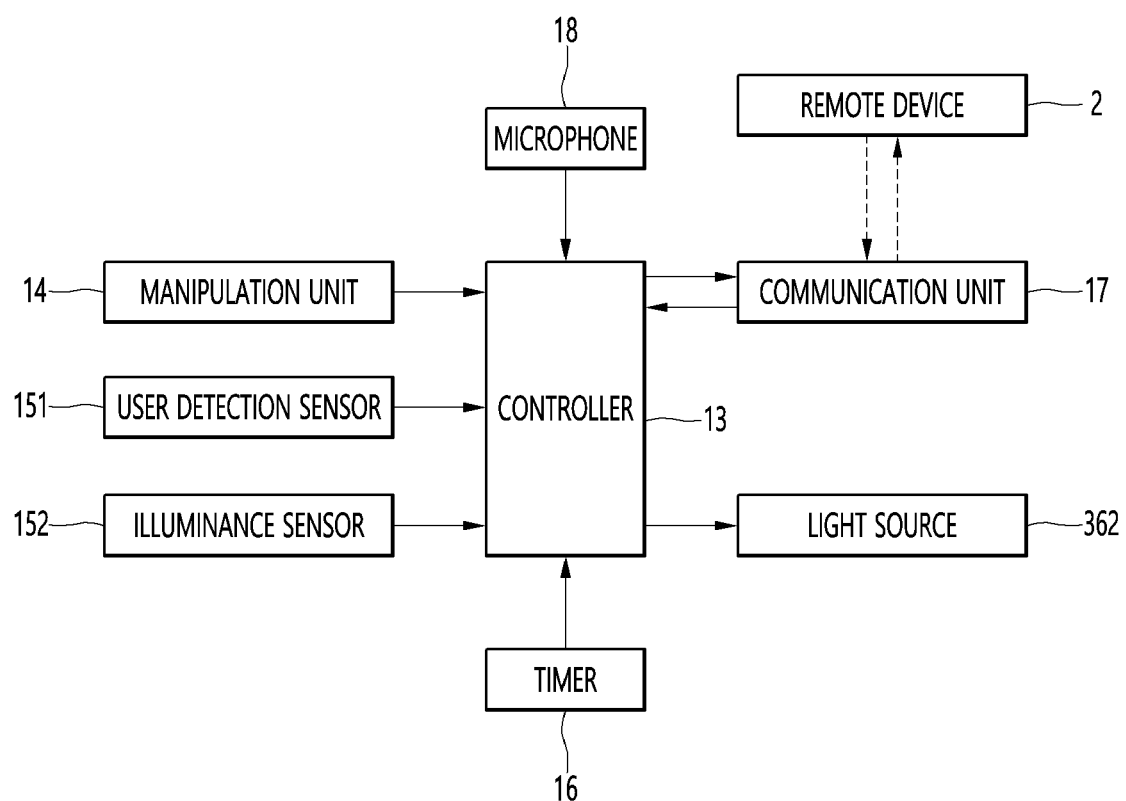
FIG. 17 is a block diagram illustrating the flow of control signals of the refrigerator.
Figure 18:
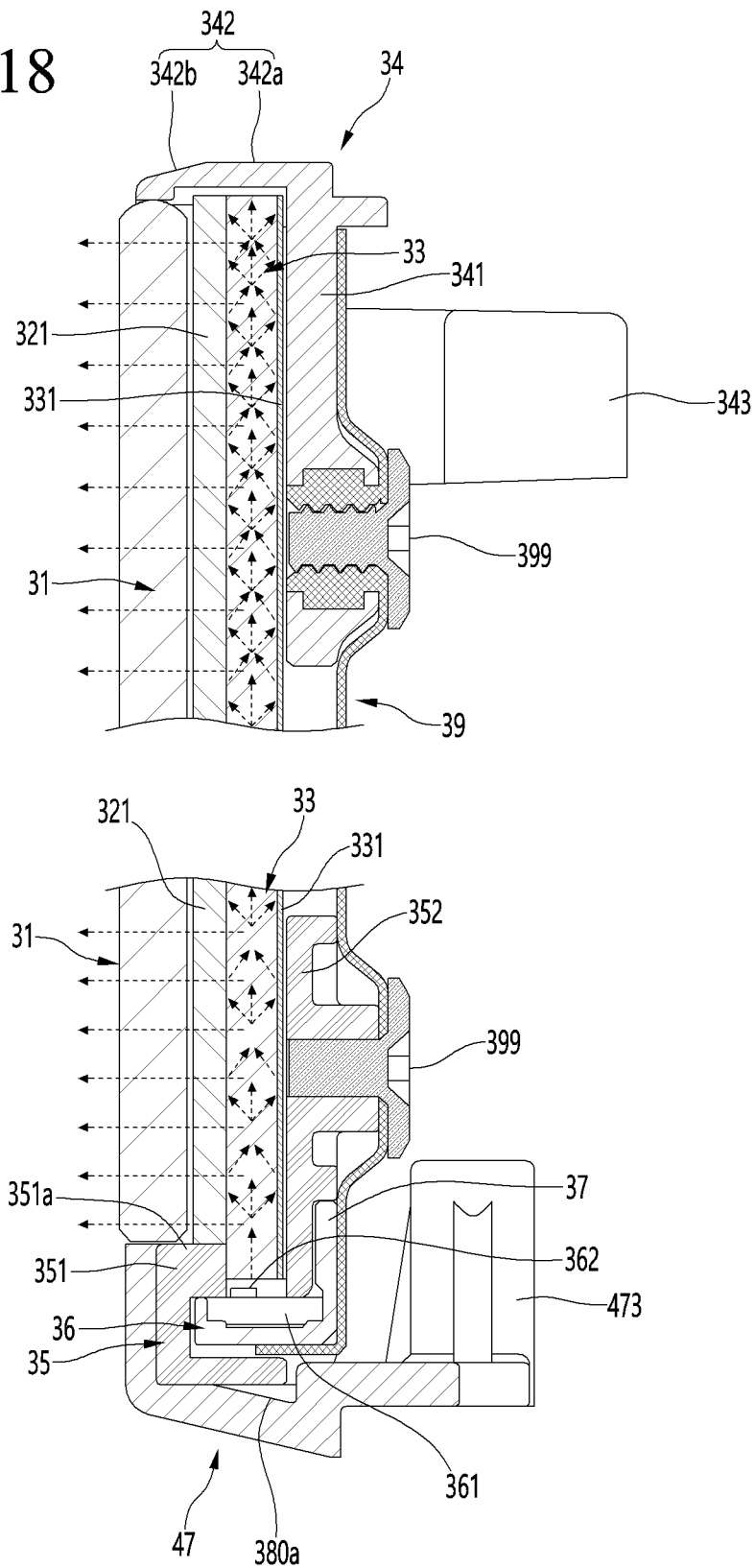
FIG. 18 is a cross-sectional view illustrating the light emitting state of the panel assembly.
Figure 19:
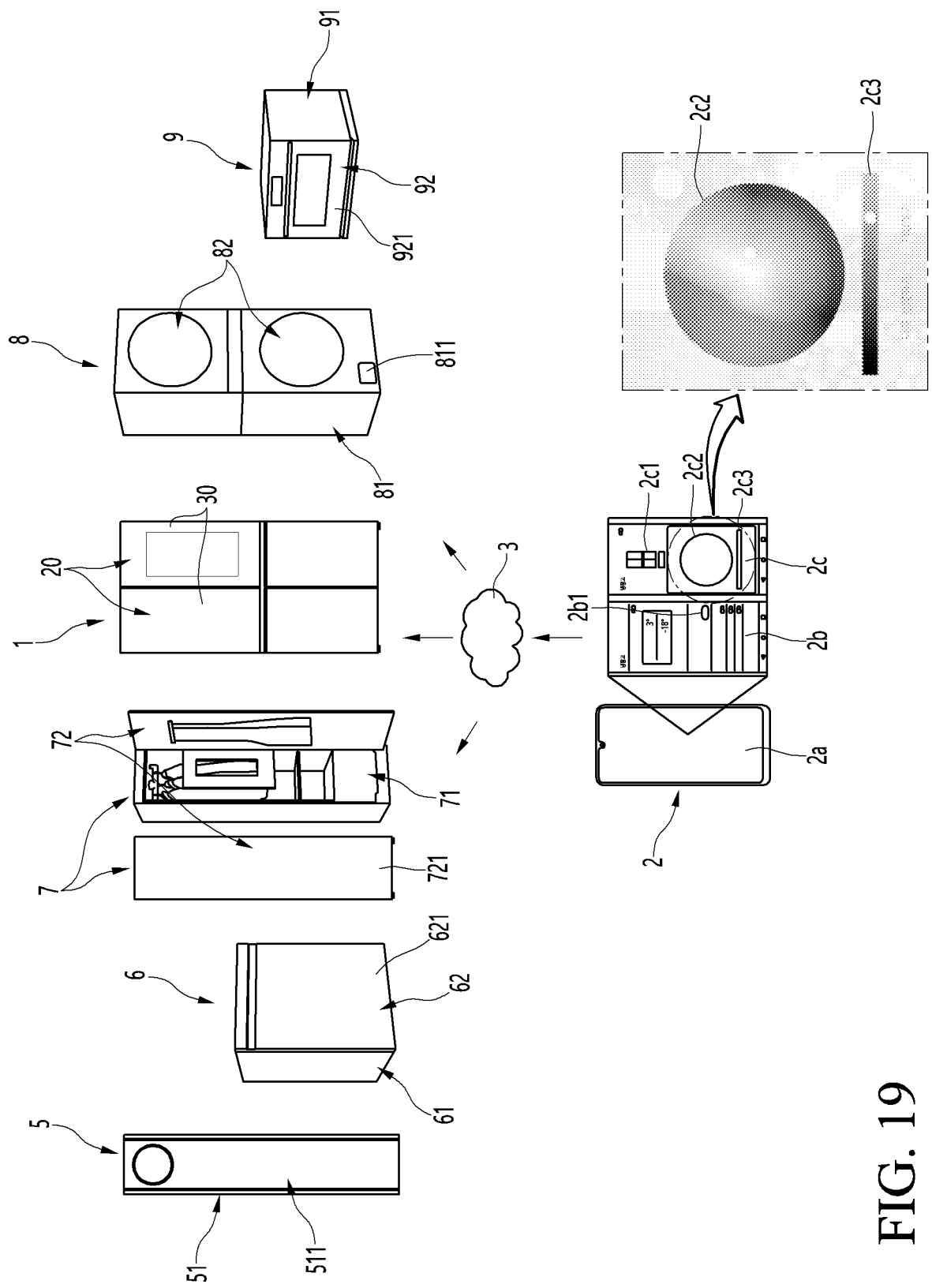
FIG. 19 is a diagram illustrating an example of adjusting the color of home appliances to which the panel assembly is applied using a remote device.

FIG. 17 is a block diagram illustrating the flow of control signals of the refrigerator, FIG. 18 is a cross-sectional view illustrating the light emitting state of the panel assembly, and FIG. 19 is a diagram illustrating an example of adjusting the color of home appliances to which the panel assembly is applied using a remote device.

As illustrated in the drawing, the home appliance according to an embodiment of the present disclosure may have an outer appearance formed by the panel assembly 30, and the outer appearance may be changed in a color set by the user according to the operation of the lighting device 36. The panel assembly may be expressed in various colors by light emitted from the rear.

The home appliance may be any one of a refrigerator 1, an air conditioner 5, a dishwasher 6, a clothes care machine 7, a washing machine 8, or a cooking appliance 9, by applying the same structure as the panel assembly 30 in an embodiment of the present disclosure to the home appliances respectively, the color of the outer appearance of the front surface may be freely changed.

For example, as in the above-described embodiment, in the refrigerator 1, the panel assembly 30 may be provided on the front surface of the door 20 that opens and closes the cabinet 10. Also, according to user settings, the panel assembly 30 may glow in a set color, and the outer appearance of the front surface of the refrigerator 1 may be changed.

As another example, the indoor unit of the air conditioner 5 may have a space provided with a heat exchange device and a fan inside the case 51 (or cabinet) forming the outer appearance. Additionally, the front surface of the case 51 may be formed by a panel assembly 511. The panel assembly 511 has the same structure as the panel assembly 30 of the refrigerator 1 described above and may emit light.

Accordingly, according to user settings, the panel assembly 511 glows in a set color, and the color of the outer appearance of the front surface of the indoor unit of the air conditioner 5 may be changed to the set color.

As another example, the dishwasher 6 may have a space for washing dishes inside the case 61 (or cabinet) that forms the outer appearance. Additionally, the front surface of the case 61 may be opened and closed by a door 62, and the front surface of the door 62 may be formed by a panel assembly 621. The panel assembly 621 has the same structure as the panel assembly 30 of the refrigerator 1 described above and may emit light.

Accordingly, according to user settings, the panel assembly 621 may glow in a set color, and the color of the outer appearance of the front surface of the dishwasher 6 may be changed to the set color.

As another example, the clothes care machine 7 may have a space for storing clothing inside the case 71 (or cabinet) that forms the outer appearance. Additionally, the front surface of the case 71 may be opened and closed by the door 72, and the front surface of the door 72 may be formed by the panel assembly 721. The panel assembly 721 has the same structure as the panel assembly 30 of the refrigerator 1 described above and may emit light.

Accordingly, according to user settings, the panel assembly 721 may glow in a set color, and the front exterior color of the clothes care machine 7 may be changed to the set color.

As another example, the washing machine 8 or dryer may have a space for washing or drying inside the case 81 (or cabinet) forming the outer appearance. Also, the front surface of the case 81 may be opened and closed by the door 82. Meanwhile, the front surface of the case 81 may be formed by the panel assembly 811. The panel assembly 811 has the same structure as the panel assembly 30 of the refrigerator 1 described above and may emit light.

Accordingly, according to user settings, the panel assembly 30 glows in a set color, and the color of the outer appearance of the front surface of the washing machine 8 or dryer may be changed to the set color.

As another example, the cooking appliance 9 may have a space for cooking food inside the case 91 (or cabinet) that forms the outer appearance. Additionally, the front surface of the case 91 may be opened and closed by a door 92, and the front surface of the door 92 may be formed by a panel assembly 921. The panel assembly 921 has the same structure as the panel assembly 30 of the refrigerator 1 described above and may emit light.

Accordingly, according to user settings, the panel assembly 921 may glow in a set color, and the color of the outer appearance of the front surface of the cooking appliance 9 may be changed to the set color.

Meanwhile, the following will look at the process of changing the color of the panel assembly 30.

When the lighting device 36 is turned off, the color of the outer appearance of the front surface may be expressed by the color of the panel 31. The color displayed on the panel 31 when the lighting device 36 is turned off may be referred to as the first color.

When the lighting device 36 is operated, the color of the panel 31 changes according to the color of the light emitted from the lighting device 36, and the color of the outer appearance of the front surface of the door 20 may be expressed in the selected color. At this time, the color of the light emitted from the lighting device 36 may be said to be a second color, and the color of the panel that changes when the lighting device 36 is turned on may be said to be a third color.

The second color may be different from the third color, and the third color of the panel 31 selected by the user may be implemented by a second color corrected in consideration of the first color of the panel 31 itself. In other words, the light of the second color emitted from the lighting device 36 may be determined by the controller 13 in consideration of the first color of the panel 31 itself, and the panel 31 may be finally displayed in the third color selected by the user while the light of the second color transmits through the panel having the first color.

In detail, the color of the panel 31 may be determined by selective operation of the lighting device 36. As an example, the lighting device 36 may be manipulated and set through a remote device 2 separate from the refrigerator 1. The refrigerator 1 may communicate with the remote device 2 through a communication unit 17 connected to the controller 13, and the user manipulates the operation of the lighting device 36 through the remote device 2.

The communication unit 17 may communicate with the remote device 2 in various ways. As an example, the communication unit 17 may have a structure capable of communicating in at least one of wired, wireless, and short-range communication (Bluetooth, Wi-Fi, Zigbee, NFC, or the like). Additionally, the remote device 2 may be a variety of devices capable of communication, such as a dedicated terminal, mobile phone, tablet, portable PC, desktop PC, remote control, or Bluetooth speaker.

The user may manipulate and set the overall operating state of the lighting device 36, such as the operating time, operating conditions, and emitting color of the light source, through manipulation of the remote device 2. For example, simple manipulation and setting of the lighting device 36 may be possible through an application or dedicated program installed on the user's mobile phone.

Selection of the changing color of the panel 31 through the remote device 2 will be examined with reference to FIG. 25. The user may select the desired panel 31 color through the screen 2a of the remote device 2, such as a mobile phone or terminal.

When the user manipulates the remote device 2, the remote device first outputs the menu screen 2b, and operates the panel color change menu 2b1 through the menu screen 2b.

When the user selects the panel color change menu 2b1, the remote device 2 outputs a color selection screen 2c on the menu screen 2b, and the user may select the position of the panel 31 to be changed and color of the panel 31 to be changed on the color selection screen.

In detail, a panel position selection menu 2c1 is displayed on the color selection screen 2c so that the panel 31 mounted on the door 20 at a desired position among the plurality of doors 20 may be selected. Additionally, the panel 31 of the door 20 selected by the user may be displayed in the panel position selection menu 2c1.

After selecting the desired location of the panel 31, the user may select and input the color selection menus 2c2 and 2c3 displayed on the color selection screen 2c. For example, the color selection menus 2c2 and 2c3 may display all colors that the panel 31 may display in the form of a color picker capable of checking and extracting color codes. The color selection menu 2c2 and 2c3 may be referred to as a palette because it allows combination and selection of various colors.

The color selection menus 2c2 and 2c3 may include a circular first selection part 2c2 and a bar-shaped second selection part 2c3. A color may be selected in the first selection part 2c2, and the exposure (intensity) of the selected color may be selected in the second selection part 2c3. The color selection menus 2c2 and 2c3 may be composed of either the first selection part 2c2 or the second selection part 2c3.

In this way, the user may select the color of the panel 31, that is, the third color, among various colors through the color selection menus 2c2 and 2c3. Of course, the color selection menus 2c2 and 2c3 may be configured to allow input in the form of character codes, numbers, or the like.

In addition, according to the user's selection of the third color, the controller 13 controls the lighting device 36 to turn on the second color so that the panel 31 may be displayed in the third color.

Additionally, the user may input a color through the manipulation unit 14 provided in the refrigerator 1 without using the remote device 2.

Additionally, the refrigerator 1 and the remote device 2 may be connected to a server in a network state, and therefore, the color of the panel 31 of the refrigerator 1 may be input through the server 3.

Meanwhile, the operation of the lighting device 36 may be performed through the user's manipulation of the manipulation unit 14. The manipulation unit 14 may be provided on one side of the refrigerator 1, and for example, may be provided on one side of the cabinet 10. Of course, the manipulation unit 14 may be provided on the door 20 as needed, and input may be performed by manipulation such as touching or knocking on the panel 31. In other words, the user may set the operation of the lighting device 36 by directly manipulating the manipulation unit 14 and may also turn the lighting device 36 on or off.

Additionally, the lighting device 36 may be operated by a sensor. For example, the sensor may be a user detection sensor 151 that detects the user's proximity. For example, the user detection sensor 151 may be an infrared sensor, an ultrasonic sensor, a laser sensor, or other devices that may detect the user's proximity to the refrigerator.

Additionally, the user detection sensor 151 may be provided on one side of the cabinet or door 20 and may be placed in various positions to detect the proximity of a user. Additionally, a plurality of sensors may be provided at different locations.

Therefore, when the user approaches the refrigerator 1 by a set distance to use the refrigerator 1, the user detection sensor 151 may detect this, transmit a signal to the controller 13, and turn on the lighting device 36. Also, when the user moves away from the refrigerator 1, the user detection sensor 151 may detect this and transmit a signal to the controller 13 to turn off the lighting device 36.

In detail, when the user detection sensor 151 detects that the user is very close to the refrigerator 1, the lighting device 36 may be turned off or the brightness may be gradually dimmed to prevent dazzling the user. Also, when the user moves away from the refrigerator 1 again, the lighting device 36 may be turned on again or returned to the original brightness thereof.

The sensor may be an illuminance sensor 152. The illuminance sensor 152 detects the illuminance of an indoor space and may be placed at the same location as the user detection sensor 151.

Additionally, the lighting device 36 may be operated according to the illuminance detected by the illuminance sensor 152. For example, when the illuminance detected by the illuminance sensor 152 becomes the set illuminance or less and it becomes dark, the controller 13 turns on the lighting device 36, and when the illuminance detected by the illuminance sensor 152 is set to the set illuminance or more and thus it becomes brighter, the controller 13 may turn off the lighting device 36.

Meanwhile, the sensor may include both the illuminance sensor 152 and the user detection sensor 151, and the illuminance sensor 152 and the user detection sensor 151 operate in a complex manner and thus the lighting device 36 may be controlled to turn on and off by the controller 13.

Additionally, the controller 13 may be connected to the microphone 18. Therefore, the LED 362 may be made to glow in a set color according to the voice signal received from the microphone 18, and the input state of the voice signal or the setting state of the function may be displayed through the color of the front surface of the door 20.

For example, when a user's temperature adjustment signal is input through the microphone 18, the controller 13 may adjust the temperature inside the refrigerator to a set temperature and may operate the lighting device 36 to change the color of the front surface of the door 20 to a color corresponding to the temperature.

Meanwhile, the lighting device 36 may be turned on and off at a time set by the timer 16. In other words, the lighting device 36 may be turned on according to the time when the user is mainly active, and remain off outside of the set time range. Additionally, the lighting device 36 may be turned off during the day and turned on at night regardless of the actual illuminance level.

In addition, regardless of the operating state of the refrigerator 1, the brightness and color of the front surface of the door 20 may be adjusted simply according to the user's settings.

Additionally, the lighting device 36 may include a brightness-adjusted state in addition to the on state and the off state. In other words, the controller 13 may vary the brightness of the panel 31 by adjusting the output of light emitted through the lighting device 36. Additionally, the operating state of the refrigerator 1 may be indicated through the brightness of the panel 31.

Meanwhile, looking at the operating state of the lighting device 36 operated by the controller 13, as illustrated in FIG. 18, when the lighting device 36 is turned on according to the instructions of the controller 13, the light emitted from the LED 362 may be emitted toward the lower end of the light guide plate 33. At this time, the light emitted from the LED 362 may be emitted in a second color selected by the controller 13. In other words, the LED 362 is an RGB LED and emits light of the second color corrected by the controller 13 so that the surface of the panel 31 glows in the third color selected by the user.

Light incident through the lower end of the light guide plate 33 may be diffused and reflected along the light guide plate 33 and may move along the light guide plate 33. At this time, the light guided by the light guide plate 33 may be reflected forward by the reflective layer 331 and transmitted to the outside through the panel 31.

Light heading forward through the light guide plate 33 passes through the support member 32 to illuminate the panel 31, and the front surface of the door 20 may glow with a set brightness or color.

At this time, the light guide plate 33 may emit light of sufficient brightness forward from the entire surface by the LEDs 362 disposed at both ends of the LED mounting part 361*a*, and thus the entire body, including both ends of the panel 31, may glow with uniform brightness.

Hereinafter, changes in the outer appearance of the front surface of the door 20 according to the operation of the lighting device 36 will be examined with reference to the drawings.

Figure 20:
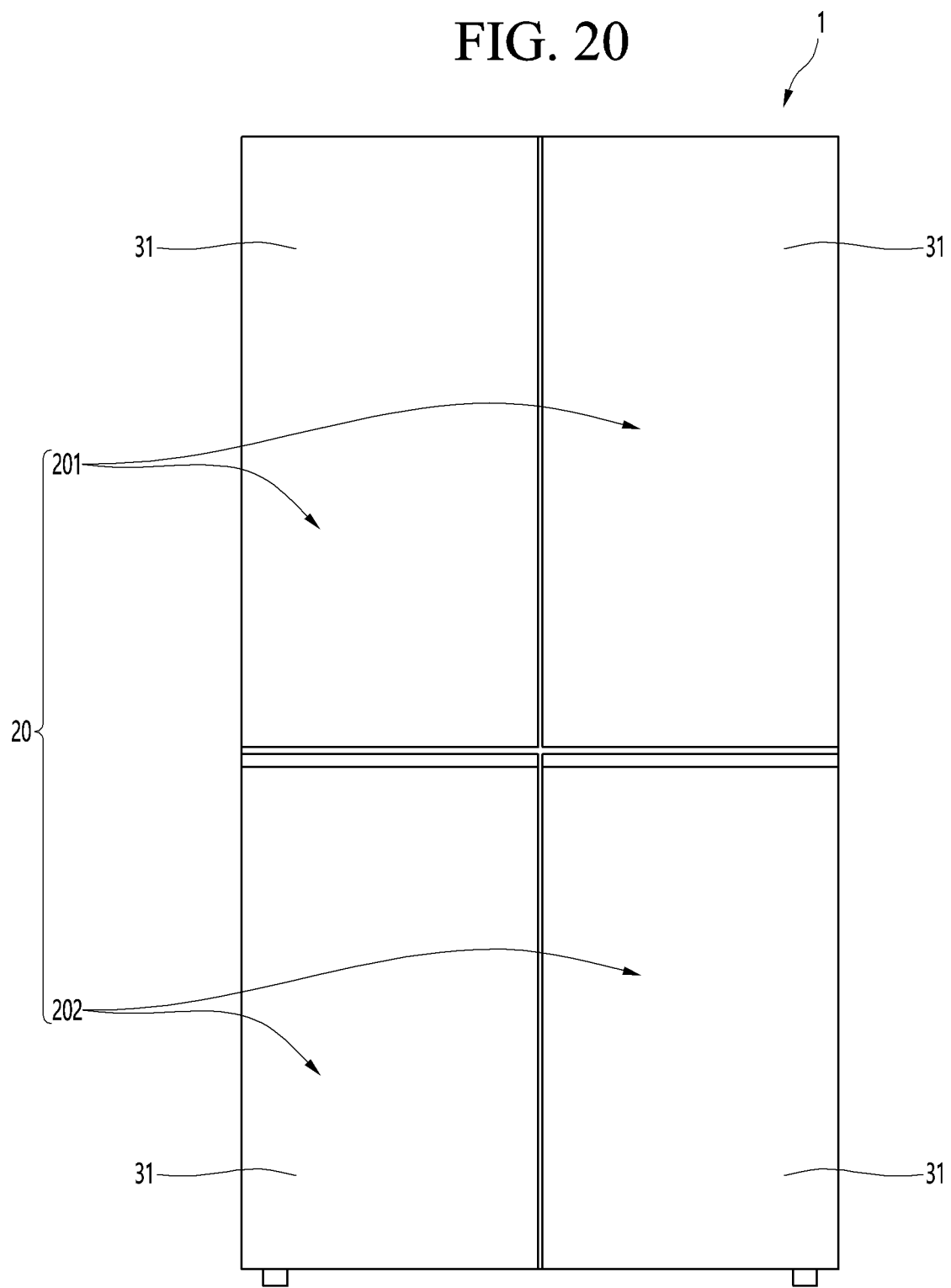
FIG. 20 is a front view illustrating the outer appearance of the front surface of the refrigerator with the lighting device turned off.
Figure 21:
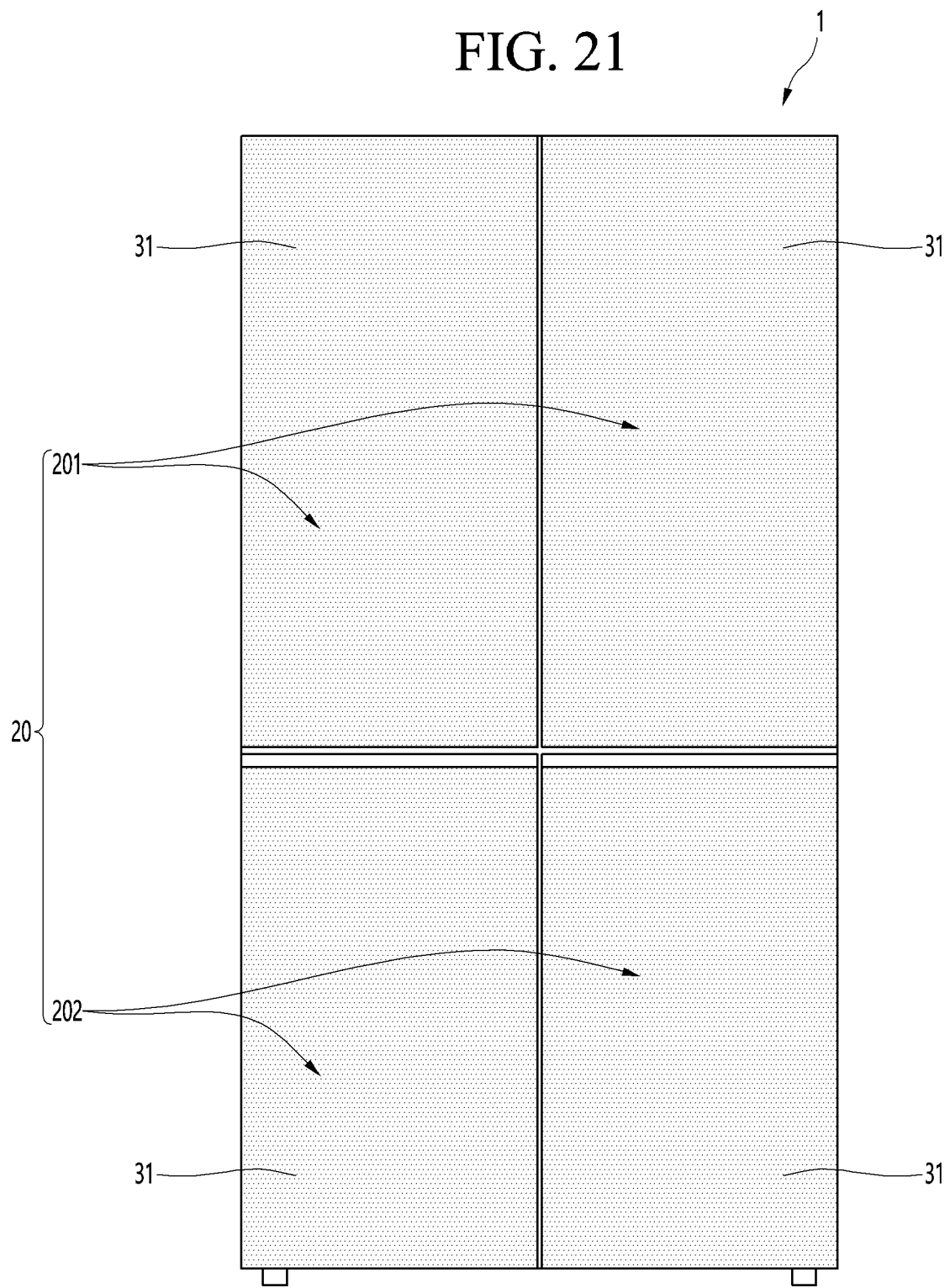
Figure 22:
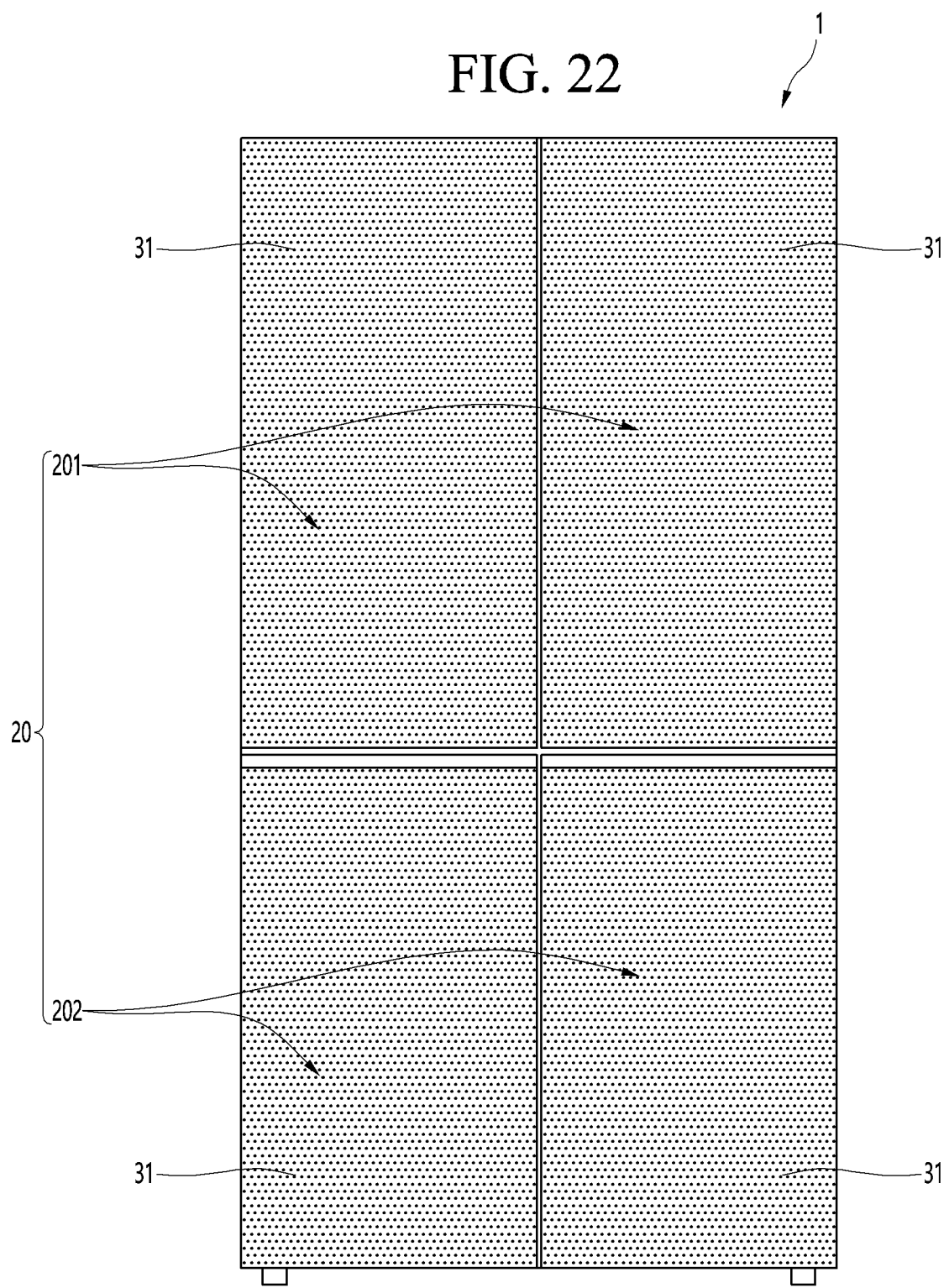
FIG. 22 is a front view illustrating the outer appearance of the front surface of the refrigerator with the color of the lighting device changed.
Figure 23:
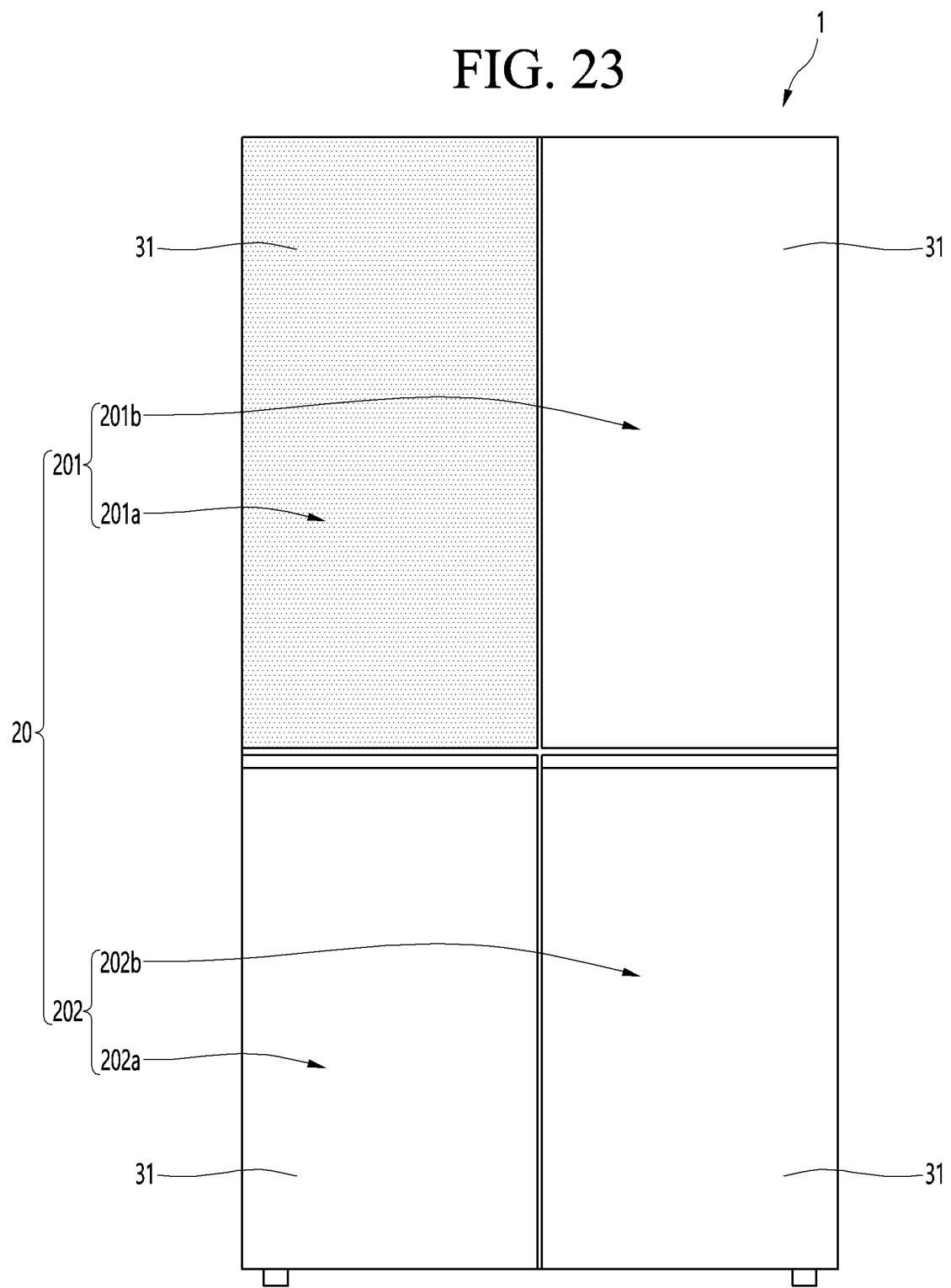
FIG. 23 is a front view illustrating the outer appearance of the front surface of the refrigerator with some of the doors emitted.

FIG. 20 is a front view illustrating the outer appearance of the front surface of the refrigerator with the lighting device turned off, FIG. 21 is a front view illustrating the outer appearance of the front surface of the refrigerator with the lighting device turned on, FIG. 22 is a front view illustrating the outer appearance of the front surface of the refrigerator with the color of the lighting device changed, FIG. 23 is a front view illustrating the outer appearance of the front surface of the refrigerator with some of the doors emitted, and FIG. 24 is a front view illustrating the outer appearance of the front surface of the refrigerator with the refrigerating chamber door and the freezing chamber door of the doors each emitting light.

In a state where the lighting device 36 is turned off, as illustrated in FIG. 20, the front surface of the door 20 does not glow, and the original color of the panel assembly 30, that is, the first color, appears.

The panel assembly 30 has a structure that may be separated from the door body 40, so the user may select the initial color of the panel 31 by mounting the panel assembly 30 of the desired color. Of course, if necessary, the user may change the color of the panel 31 when the lighting device 36 is turned off by replacing the panel assembly 30 itself.

The color of the front surface of the door 20 may be seen as the color of the panel 31, and the texture and pattern formed on the panel 31 may be visible. At this time, the color of the panel 31 may have a brightness greater than 0 and may be a color other than black.

Accordingly, the front surface of the door 20 is displayed in the first color, which is the color of the panel 31. At this time, the internal components of the panel assembly 30 are seen through according to the color of the panel 31 and become invisible to the outside.

In this state, the lighting device 36 may be turned on, and when the lighting device 36 is turned on, the front surface of the door 20 glows in a color selected by the user.

For example, as illustrated in FIG. 21, the controller 13 may control the front surface of the door 20 to glow in a third color different from the first color, and, by the lighting device 36, the LED 362 may be made to glow in a second color according to the control of the controller 13. At this time, the third color may be selected by the user, and the color of the panel 31 may be selected by manipulating the remote device 2 or the manipulation unit 14.

When the LED 362 glows in the second color, the light reflected by the light guide plate 33 passes through the front surface of the panel 31, and the front surface of the door 20, that is, the panel 31, may be displayed in 3 colors.

Meanwhile, when the controller 13 instructs to change the color of the light emitted from the lighting device 36 in a state where the outer appearance of the front surface of the refrigerator 1 glows in a third color, the panel 31 glows in a different color reset by the controller 13.

For example, as illustrated in FIG. 22, the controller 13 may instruct the panel 31 to glow in a fourth color different from the third color, and the lighting device 36 may emit light of different colors according to the instruction of the controller 13.

When the LED 362 glows in a different color, the light reflected by the light guide plate 33 passes through the panel 31, and the front of the door 20, that is, the panel 31 may be displayed in the fourth color.

Meanwhile, the panel 31 constituting some of the doors 20 among the plurality of doors 20 forming the outer appearance of the front surface of the refrigerator 1 emits light, or the panel 31 constituting the plurality of doors 20 emits light independently to form the outer appearance of the front surface of the refrigerator 1 in a set color.

For example, as illustrated in FIG. 23, the refrigerator 1 may be operated so that the panel 31 of some of the doors 20 among the plurality of doors 20 glows or glows in a specific color. In other words, not all of the lighting devices 36 provided on the doors 20 are operated, but only some doors 201*a* of all the doors 20 may be configured to glow. As an example, one 201*a* of the refrigerating chamber doors 201 may glow. In other words, among the left refrigerating chamber door 201*a* and the right refrigerating chamber door 201*b*, the left refrigerating chamber door 201*a* may glow. Of course, as the door 20, any one of the freezing chamber doors 202 may glow.

If necessary, the left refrigerating chamber door 201*a* and the right refrigerating chamber door 201*b* may glow in different colors from each other. Also, the colors of at least two of the doors 20 may change sequentially, and at least two doors 20 may be turned on and off sequentially.

Meanwhile, among the doors, the refrigerating chamber door 20 or the freezing chamber door 20 may be controlled to glow in different colors.

As an example, as illustrated in FIG. 24, the controller 13 may control the lighting device 36 so that the panels of the pair of refrigerating chamber doors 201 appear in one color. Additionally, the controller 13 may control the lighting device 36 so that the pair of refrigerating chamber doors 201 appear in different colors.

In other words, the refrigerating chamber door 201 and the freezing chamber door 202 may be distinguished by color, and the colors of the refrigerating chamber door 201 and the freezing chamber door 202 may also be changed according to changes in temperature inside the refrigerator.

Accordingly, the user may intuitively determine the operation state of each storage space as well as the distinction between the refrigerator and freezing chambers through the color of the front surface of the door 20.

Meanwhile, various other embodiments of the present disclosure may be possible in addition to the above-described embodiments. Another embodiment of the present disclosure is characterized in that the storage space is divided into left and right sides, and the door is composed of a refrigerating chamber door and a freezing chamber door on both left and right sides. Another embodiment of the present disclosure has the same structure as the above-described embodiment except for the disposition of the storage space and the door, and the same reference numerals are used for the same components and detailed description thereof will be omitted.

INDUSTRIAL APPLICABILITY

The home appliance according to an embodiment of the present disclosure has industrial applicability because the color of the front panel may be changed to a desired color without replacing the panel forming the outer appearance of the front surface.

The invention claimed is:
1. A home appliance comprising:
a cabinet forming a storage space;
a door configured to open and close an open front surface of the cabinet; and
a panel assembly mounted on a front surface of the door, wherein the panel assembly includes:
a front plate forming an outer appearance of the front surface of the door and allowing light to pass through;
a light guide plate provided behind the front plate and configured to guide light toward the front plate; and
a lighting device including a plurality of light sources that emit light of a set color toward the light guide plate and a substrate on which the plurality of light sources are arranged, and
wherein the front plate includes an inclined part formed at one end adjacent to the lighting device and having an inclined surface extending in a direction parallel to a direction in which the light source is arranged.

2. The home appliance of claim 1,
wherein the light source is arranged in a row from one end to another end of the substrate in an extension direction.

3. The home appliance of claim 1, further comprising:
a bracket in which the lighting device is accommodated,
wherein the inclined part is spaced apart from the bracket and is formed in a direction facing one surface of the bracket.

4. The home appliance of claim 1,
wherein a front inclined part having an inclined surface is formed at an end portion facing the inclined part at the front surface of the front plate.

5. The home appliance of claim 1,
wherein a front curved portion formed as a rounded curved surface is formed on an end portion facing the inclined part at the front surface of the front plate.

6. The home appliance of claim 3,
wherein the front plate has a right-angled part at a position where the inclined part is formed, in place of the inclined part, so that one surface of the bracket and a rear surface of the front plate are perpendicular to each other.

7. The home appliance of claim 1,
wherein the lighting device is provided to be spaced downward from a lower surface of the light guide plate, and
wherein the inclined part is formed at a lower end of a rear surface of the front plate.

8. The home appliance of claim 7, further comprising:
a bracket on which the lighting device is accommodated; and,
a plate supporter configured to cover at least a portion of the bracket and to be in contact with one surface of the front plate,
wherein an upper surface of the plate supporter is in contact with at least a portion of a lower surface of the front plate.

9. The home appliance of claim 7,
wherein a lower end of the front plate is located higher than the light source, and
wherein a lower end of the light guide plate is located lower than the lower end of the front plate.

10. The home appliance of claim 7,
wherein the inclined part is inclined upward toward a rear.

11. The home appliance of claim 7,
wherein the inclined part is located higher than the light source.

12. The home appliance of claim 8, further comprising:
a support member disposed between the front plate and the light guide plate to space the light guide plate away from the front plate.

13. The home appliance of claim 12,
wherein an upper end of the inclined part is formed so that an angle formed by a first imaginary line L1 connected from a center of the light source to the upper end of the inclined part and a horizontal line L0 extending from the center of the light source in the direction in which the plate supporter is located satisfies an angle smaller than the angle formed by a second imaginary line L2 connected from the center of the light source to a lower end of a rear surface of the support member and the horizontal line L0.

14. The home appliance of claim 8,
wherein a lower end of the inclined part is formed so that an angle formed by a third virtual line connected from a center of the light source to a lower end of the inclined part and a horizontal line L0 extending from the center of the light source in the direction in which the plate supporter is located satisfies an angle greater than the angle formed by a fourth imaginary line L4 connected from the center of the light source to a front end of the upper surface of a front surface portion of the bracket and the horizontal line L0.

15. The home appliance of claim 8,
wherein a vertical distance from a lower end to an upper end of the inclined part is shorter than a distance at which a lower end portion of the light guide plate is inserted from an upper end of a front surface portion of the bracket.

* * * * *